(12) United States Patent
Mizukura et al.

(10) Patent No.: US 7,489,346 B2
(45) Date of Patent: Feb. 10, 2009

(54) IMAGE PICK-UP DEVICE AND IMAGE PICK-UP METHOD ADAPTED WITH IMAGE PICK-UP SENSITIVITY

(75) Inventors: Takami Mizukura, Kanagawa (JP); Naoya Katoh, Chiba (JP); Ken Nakajima, Tokyo (JP); Hiroki Nagahama, Tokyo (JP)

(73) Assignee: Sony Corporation, Tokyo (JP)

( * ) Notice: Subject to any disclaimer, the term of this patent is extended or adjusted under 35 U.S.C. 154(b) by 583 days.

(21) Appl. No.: 10/540,404

(22) PCT Filed: Dec. 2, 2003

(86) PCT No.: PCT/JP03/15437

§ 371 (c)(1),
(2), (4) Date: Jun. 23, 2005

(87) PCT Pub. No.: WO2004/059987

PCT Pub. Date: Jul. 15, 2004

(65) Prior Publication Data

US 2006/0082665 A1  Apr. 20, 2006

(30) Foreign Application Priority Data

Dec. 25, 2002  (JP) ............................. 2002-375423

(51) Int. Cl.
   H04N 9/73   (2006.01)
   H04N 5/217  (2006.01)
   G06K 9/00   (2006.01)

(52) U.S. Cl. ..................... 348/223.1; 348/241; 382/162

(58) Field of Classification Search ............. 348/223.1, 348/234, 241, 273
See application file for complete search history.

(56) References Cited

U.S. PATENT DOCUMENTS

| 4,688,085 A | 8/1987 | Imaide |
| 5,668,596 A | 9/1997 | Vogel |
| 6,256,062 B1 | 7/2001 | Endo |
| 2002/0012463 A1* | 1/2002 | Yamada ..................... 382/167 |

FOREIGN PATENT DOCUMENTS

| EP | 0 475 445 | 3/1992 |
| JP | 2001-251644 | 9/2001 |
| JP | 2001-359114 | 12/2001 |
| JP | 2003-116146 | 4/2003 |
| JP | 2003-235050 | 8/2003 |
| JP | 2003-284082 | 10/2003 |
| JP | 2003-284084 | 10/2003 |
| WO | WO 02 37863 | 5/2002 |

* cited by examiner

Primary Examiner—Lin Ye
Assistant Examiner—Kelly L Jerabek
(74) Attorney, Agent, or Firm—Frommer Lawrence & Haug LLP; William S. Frommer; Thomas F. Presson

(57) ABSTRACT

In an image pick-up apparatus including an image pick-up unit comprised of color filters having different spectral characteristics, and serving to pick up image of object, there are provided an adjustment unit for adjusting color reproduction value and noise value representing noise feeling, a matrix coefficient determination unit for determining matrix coefficients on the basis of adjustment of the adjustment unit, and a matrix transform processing unit for performing matrix transform processing with respect to image which has been picked up at the image pick-up device unit on the basis of the matrix coefficients.

5 Claims, 16 Drawing Sheets

| EVALUATION COEFFICIENT NAME | NO. OF FILTERS WHICH CAN BE EVALUATED AT A TIME | TAKING INTO CONSIDERATION SPECTRAL REFLECTION FACTOR OF OBJECT | TAKING INTO COSIDERATION NOISE REDUCTION |
| --- | --- | --- | --- |
| q - factor | 1 | × | × |
| μ - factor | PLURAL | × | × |
| FOM (Figure of Merit) | PLURAL | ○ | × |
| UMG (Unified Measure of Goodness) | PLURAL | ○ | ○ |

FIG.8

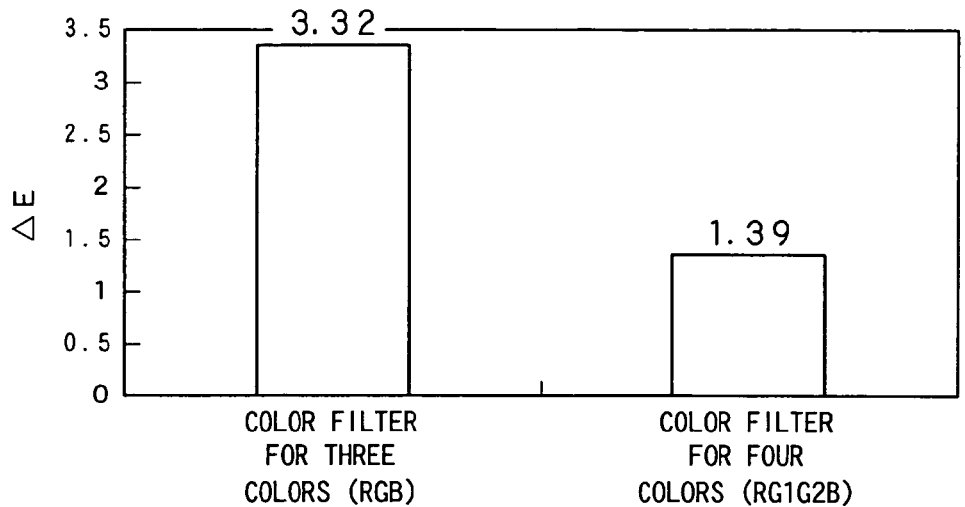
FIG. 17
| COLOR FILTER FOR FOUR FOUR COLORS HAVING SPECTRAL SENSITIVITY CHARACTERISTIC OF FIG. 15 | R | G | B |
|---|---|---|---|
| R1 | 49.4 | 64.1 | 149.5 |
| R2 | 66.0 | 63.7 | 155.6 |
FIG. 18
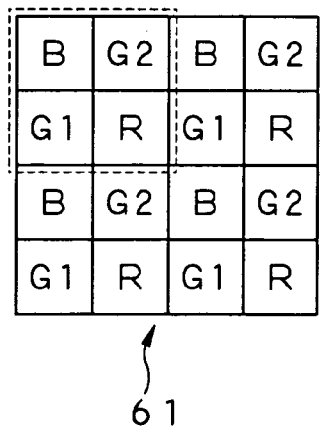
61
FIG. 19

IMAGE PICK-UP DEVICE AND IMAGE PICK-UP METHOD ADAPTED WITH IMAGE PICK-UP SENSITIVITY

TECHNICAL FIELD

The present invention relates to an image pick-up apparatus and an image pick-up method which are adapted for picking up image of object, and more particularly to an image pick-up apparatus and an image pick-up method which are adapted for performing image pick-up operation in a manner suitable with respect to image pick-up sensitivity.

Further, this Application claims priority of Japanese Patent Application No. 2002-375423, filed on Dec. 25, 2002, the entirety of which is incorporated by reference herein.

BACKGROUND ART

In recent years, image pickup apparatuses (digital cameras, and/or color scanners, etc.) and image processing softwares which are oriented to consumer have been popularized. Users who themselves edit, by image processing software, image generated by picking up an image of object by the image pick-up apparatus are being increased. Moreover, request with respect to picture quality of image which has been picked up by the image pick-up apparatus has become strong. Ratio of users who mention that picture quality is high as main condition in purchasing the image pick-up apparatus is being increased. Here, general configuration of the image pick-up apparatus will be described below.

In the image pick-up apparatus, there is used, e.g., color filter 1 for three primary colors of RGB as shown in FIG. 1. In this example, color filter 1 is constituted by the so-called Bayer arrangement with four filters in total of two G filters serving to allow only light of green (G) to be transmitted therethrough, one R filter serving to allow only light of red (R) to be transmitted therethrough and one B filter serving to allow only light of blue (B) to be transmitted therethrough being as minimum unit as indicated by single dotted lines of FIG. 1.

FIG. 2 is a block diagram showing a configuration example of a signal processing unit 11 for implementing various processing to RGB signals which have been acquired by CCDs (Charge Coupled Devices) having the RGB color filter 1.

An offset correction processing unit 21 serves to remove offset component included in an image signal which has been delivered from a front end 13 for implementing a predetermined processing to signals which have been acquired by the CCD image pick-up devices to output an image signal thus obtained to a white balance correction processing unit 22. The white balance correction processing unit 22 serves to correct balance of respective colors on the basis of color temperature of the image signal which has been delivered from the offset correction processing unit 21 and differences of sensitivities of respective filters of the color filter 1. The color signal acquired after undergone correction by the white balance correction processing unit 22 is outputted to a gamma (γ)-correction processing unit 23. The gamma-correction processing unit 23 performs gamma-correction with respect to a signal which has been delivered from the white balance correction processing unit 22 to output a signal thus acquired to a vertical direction simultaneous-izing (synchronizing) processing unit 24. At the vertical direction simultaneous-izing processing unit 24, delay elements are provided. Shifts of times in vertical direction of signal which have been delivered from the gamma-correction processing unit 23 are simultaneous-ized (synchronized).

A RGB signal generation processing unit 25 performs interpolation processing for interpolating color signal delivered from the vertical direction simultaneous-izing processing unit 24 into phase of the same space, noise rejection (removal) processing for rejecting or removing noise component of signal, filtering processing for limiting signal band, and high frequency band correction processing for correcting high frequency band component of the signal band, etc. to output RGB signals thus obtained to a luminance signal generation processing unit 26, and a color difference signal generation processing unit 27.

The luminance signal generation processing unit 26 serves to synthesize, at a predetermined synthesis ratio, RGB signals which have been delivered from the RGB signal generation processing unit 25 to generate a luminance signal (Y). The color difference signal generation processing unit 27 serves to similarly synthesize, at a predetermined synthesis ratio, RGB signals which have been delivered from the RGB signal generation processing unit 25 to generate color difference signals (Cb, Cr). The luminance signal (Y) generated by the luminance signal generation processing unit 26 and the color difference signals (Cb, Cr) generated by the color difference signal generation processing unit 27 are outputted to a monitor provided at the outside of the signal processing unit 11, for example.

In a manner as stated above, it is generally performed to implement gamma-processing to an original signal and to conduct thereafter image processing (linear matrix processing) by linear transform processing.

In the image pick-up apparatus as described above, there are instances where since when image of object is picked up to generate image, way of seeing varies depending upon visual environment at the time of observation, reproduction into desired color may not be performed. This is the phenomenon taking place in the case where color rendering characteristics of light source at the time of image pick-up operation (hereinafter referred to as image pick-up light source) and light source at the time of observation (hereinafter referred to an observation light source) are greatly different from each other. In view of the above, there is proposed, in the Japanese Patent Application Laid Open No. 2002-142231 publication, etc., a method of satisfactorily performing color reproduction even in the case where image is reproduced by the observation light source having color rendering characteristic different from that of the image pick-up light source. Moreover, characteristics of spectral sensitivities are shown in FIGS. 3 and 4. Curve L1 of FIG. 3 indicates spectral sensitivity of R, curve L2 indicates spectral sensitivity of G, and curve L3 indicates spectral sensitivity of B. Further, curve L11 of FIG. 4 indicates spectral sensitivity of R, curve L12 indicates spectral sensitivity of G, and curve L13 indicates spectral sensitivity of B.

On the other hand, in the image pick-up apparatus as described above, addition of the linear matrix processing is performed, and addition of color filter of the image pick-up device is further performed, thereby making it possible to dramatically improve color reproduction characteristic (reproducibility). In this instance, when coefficients of a linear matrix used is determined so that color difference is simply minimized, there are instances where noise may be increased as compared to the prior art.

DISCLOSURE OF THE INVENTION

An object of the present invention is to provide an image pick-up apparatus and an image pick-up method which can perform linear matrix processing using coefficients in which color reproduction characteristic and noise reduction characteristic are taken into consideration in dependency upon image pick environment and/or image pick-up condition, etc.

The image pick-up apparatus according to the present invention is directed to an image pick-up apparatus including an image pick-up unit comprised of color filters having different spectral characteristics and serving to pick up image of object, which comprises: adjustment means for adjusting color reproduction value and noise value representing noise feeling; matrix coefficient determination means for determining matrix coefficients on the basis of adjustment of the adjustment means; and matrix transform processing means for performing matrix transform processing with respect to an image which has been picked up at the image pick-up device unit on the basis of the matrix coefficients.

In addition, the image pick-up method according to the present invention is directed to an image pick-up method of picking up an image of object by an image pick-up apparatus including an image pick-up unit comprised of color filters having different spectral characteristics and serving to pick up image of object, which includes: a first step of adjusting color reproduction value and noise value representing noise feeling; a second step of determining matrix coefficients on the basis of adjustment of the first step; and a third step of performing matrix transform processing with respect to an image which has been picked up at the image pick-up unit on the basis of the matrix coefficients.

Still further objects of the present invention and practical merits obtained by the present invention will become more apparent from the description of the embodiments which will be given below.

BRIEF DESCRIPTION OF THE DRAWINGS

FIG. 8 is a view showing feature of evaluation coefficients.

FIG. 17 is a view showing an example of evaluation result of color difference.

FIG. 18 is a view showing chromaticity of a predetermined object by color filter for four colors.

FIG. 19 is a view showing another example of color filter for four colors provided in the image pick-up apparatus to which the present invention is applied.

BEST MODE FOR CARRYING OUT THE INVENTION

Figure 5:
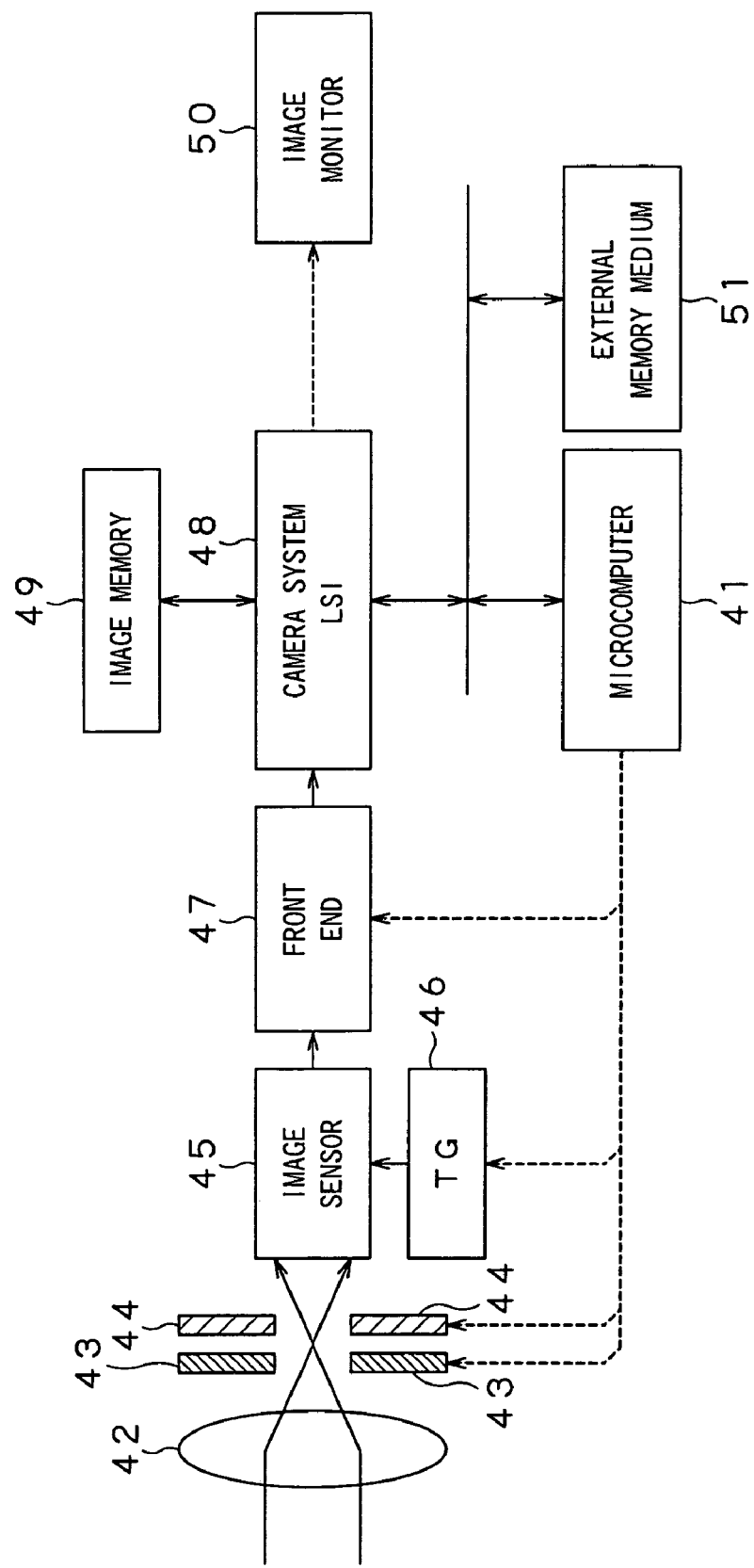
FIG. 5 is a block diagram showing a configuration example of an image pick-up apparatus to which the present invention is applied.

FIG. 5 is a block diagram showing a configuration example of an image pickup apparatus to which the present invention is applied.

In the image pick-up apparatus shown in FIG. 5, a color filter for discriminating between four kinds of colors (rays of light) is provided at the front face (the face opposite to lens 42) of an image sensor 45 comprised of CCDs (Charge Coupled Devices), etc. It is to be noted that, in the image pick-up apparatus, the color filter provided at the image sensor 45 of FIG. 5 is caused to be a filter 61 for four colors shown in FIG. 6.

Figure 6:
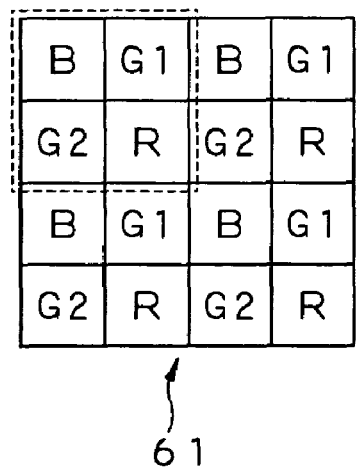
FIG. 6 is a view showing an example of color filter for four colors provided in the image pick-up apparatus to which the present invention is applied.

The color filter 61 for four colors is constituted with four filters in total of R filter for allowing only red light to be transmitted therethrough, B filter for allowing only blue light to be transmitted therethrough, G1 filter for allowing only green light of the first wavelength band to be transmitted therethrough, and G2 filter for allowing green light of the second wavelength band, which has high correlation with respect to the G1 filter, to be transmitted therethrough being as the minimum unit as indicated by single dotted lines of FIG. 6. Moreover, the G1 filter and the G2 filter are arranged at positions diagonal to each other within the minimum unit thereof.

As described in detail later, the number of kinds of colors of image acquired by the image sensor 45 is caused to be four, and color information to be acquired is increased, thereby making it possible to more precisely represent color as compared to the case where only three kinds of colors (RGB) are acquired. Further, it becomes possible to improve the fact that color seen as different color by the eye is reproduced into different color, and color seen as the same color is reproduced into the same color ("discriminating characteristic of color").

Figure 7:
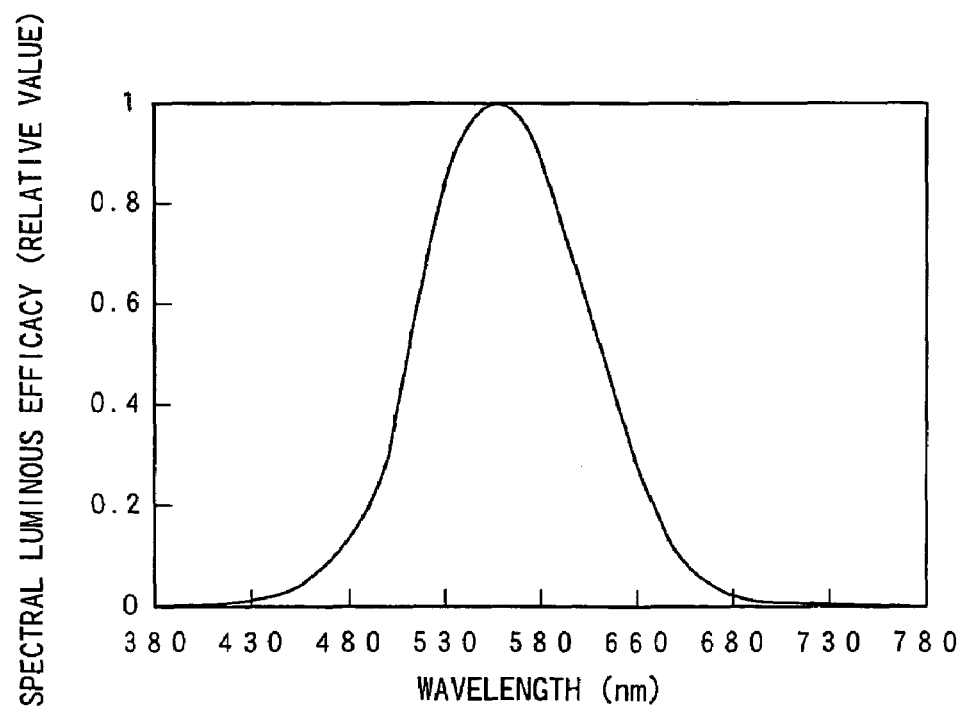
FIG. 7 is a view showing an example of spectral luminous efficacy curve.

It is to noted that the eye of the human being is sensitive to luminance as understood from spectral luminous efficacy curve shown in FIG. 7. Accordingly, in the color filter 61 for four colors shown in FIG. 6, there is supplemented color filter of G2 having spectral sensitivity characteristic close to spectral luminous efficacy curve in which more precise luminance information is acquired so that gradation of luminance can be raised, and image close to way of seeing of the eye can be reproduced (there is supplemented green G2 filter newly determined with respect to filters of R, G1, B corresponding to R, G, B of FIG. 1).

Moreover, as filter evaluation coefficient used in determining color filter 61 for colors, there is used UMG (Unified Measure of Goodness) which is coefficient in which, e.g., both "color reproduction charcteristic" and "noise reduction characteristic" are taken into consideration.

In the evaluation using UMG, its evaluation value does not become high in the case where filter to be evaluated simply satisfies the router condition, but overlap of spectral sensitivity distributions of respective filters is also taken into consideration. Accordingly, noise can be more reduced as compared to the case of the color filter evaluated by utilizing q-factor, μ-factor or FOM (Figure of Merit). Namely, by evaluation using UMG, there is selected filter in which spectral sensitivity characteristics of respective filters overlap with each other to a certain degree, but substantially all characteristics do not overlap as in the case of the characteristic of R and the characteristic of G of FIG. 4. For this reason, even in the case where respective color signals are amplified for the purpose of separation of colors, it is unnecessary to allow amplification factor to be so large. Followed by this, it is suppressed that noise component is amplified.

FIG. 8 is a view showing feature of respective filter evaluation coefficients. It is to be noted that FIG. 8 shows the matter relating to the number of filters which can be evaluated at a time, whether or not spectral reflection factor of object is taken into consideration, and whether or not reduction of noise is taken into consideration with respect to respective evaluation coefficients.

As shown in FIG. 8, q-factor indicates that the number of filters which can be evaluated at a time is only "one", and spectral reflection factor of object and reduction of noise are not taken into consideration. Moreover, μ-factor indicates that while plural filters can be evaluated at a time, spectral reflection factor of object and reduction of noise are not taken into consideration. Further, FOM indicates that while plural filters can be evaluated at a time and spectral reflection factor of object is taken into consideration, reduction of noise is not taken into consideration.

On the contrary, UMG used in determining color filter 61 for four colors indicates that plural filters can be evaluated at a time, and spectral reflection factor of object is taken into consideration and reduction of noise is also taken into consideration.

It is to be noted that the detail of q-factor is disclosed in 'H. E. J. Neugebauer "Quality Factor for Filters Whose Spectral Transmittances are Different from Color Mixture Curves, and Its Application to Color Photography" JOURNAL OF THE OPTICAL SOCIETY OF AMERICA, VOLUME 46, NUMBER 10', and the detail of μ-factor is disclosed in 'P. L. Vora and H. J. Trussell, "Measure of Goodness of a set of color-scanning filters", JOURNAL OF THE OPTICAL SOCIETY OF AMERICA, VOLUME 10, NUMBER 7'. Moreover, the detail of FOM is disclosed in 'G. Sharma and H. J. Trussell, "Figures of Merit for Color Scanners, IEEE TRANSACTION ON IMAGE PROCESSING, VOLUME 6', and the detail of UMG is disclosed in 'S. Quan, N. Ohta, and N. Katoh, "Optimal Design of Camera Spectral Sensitivity Functions Based on Practical Filter Components", CIC, 2001'.

Returning to the explanation of FIG. 5, the microcomputer 41 controls the entire operation in accordance with predetermined control programs. For example, the microcomputer 41 performs exposure control by an iris 43, opening/closing control of a shutter 44, control of electronic shutter of a TG (Timing Generator) 46, gain control at a front end 47, mode control of a camera system LSI (Large Scale Integrated Circuit) 48, and parameter control, etc.

The iris 43 adjusts passing of light (iris) converged by a lens 42 to control light quantity which is taken thereinto by image sensor 45. The shutter 44 controls passing of light which has been converged by the lens 42 on the basis of instruction of the microcomputer 41.

The image sensor 45 further includes image pick-up device comprised of CCDs or CMOSs (Complementary Metal Oxide Semiconductors), and serves to convert rays of light incident through color filter 61 for four colors formed at the front face of the image pick-up device into electric signals to output four kinds of color signals (R signal, G1 signal, G2 signal, B signal) to the front end 47. At the image sensor 45, color filter 61 for four colors of FIG. 6 is provided, so that from rays of light incident through the lens 42, components of wavelengths of respective bands of R, G1, G2, B are extracted. It is to be noted that the detail thereof will be described later with reference to FIG. 15.

The front end 47 implements correlating double sampling processing for removing noise component, gain control processing and digital conversion processing, etc. to color signal delivered from the image sensor 45. The image data obtained after undergone various processing by the front end 47 is outputted to the camera system LSI 48.

As described in detail later, the camera system LSI 48 performs various processing with respect to the image data delivered from the front end 47 to generate, e.g., luminance signal and color signal, to output those signals to image monitor 50, and to allow the image monitor 50 to display image corresponding to the signals.

An image memory 49 is comprised of, e.g., DRAM (Dynamic Random Access Memory), or SDRAM (Synchronous Dynamic Random Access Memory), etc., and is suitably utilized when the camera system LSI 48 performs various processing. An external memory medium 51 comprised of semiconductor memory or disc, etc. is detachably constituted with respect to, e.g., the image pick-up apparatus of FIG. 5, so that image data compressed by JPEG (Joint Photographic Expert Group) format by the camera system LSI 48 are stored thereinto.

The image monitor 50 is comprised of, e.g., LCD (liquid Crystal Display), etc., and serves to display picked-up images and/or various menu pictures, etc.

Figure 9:
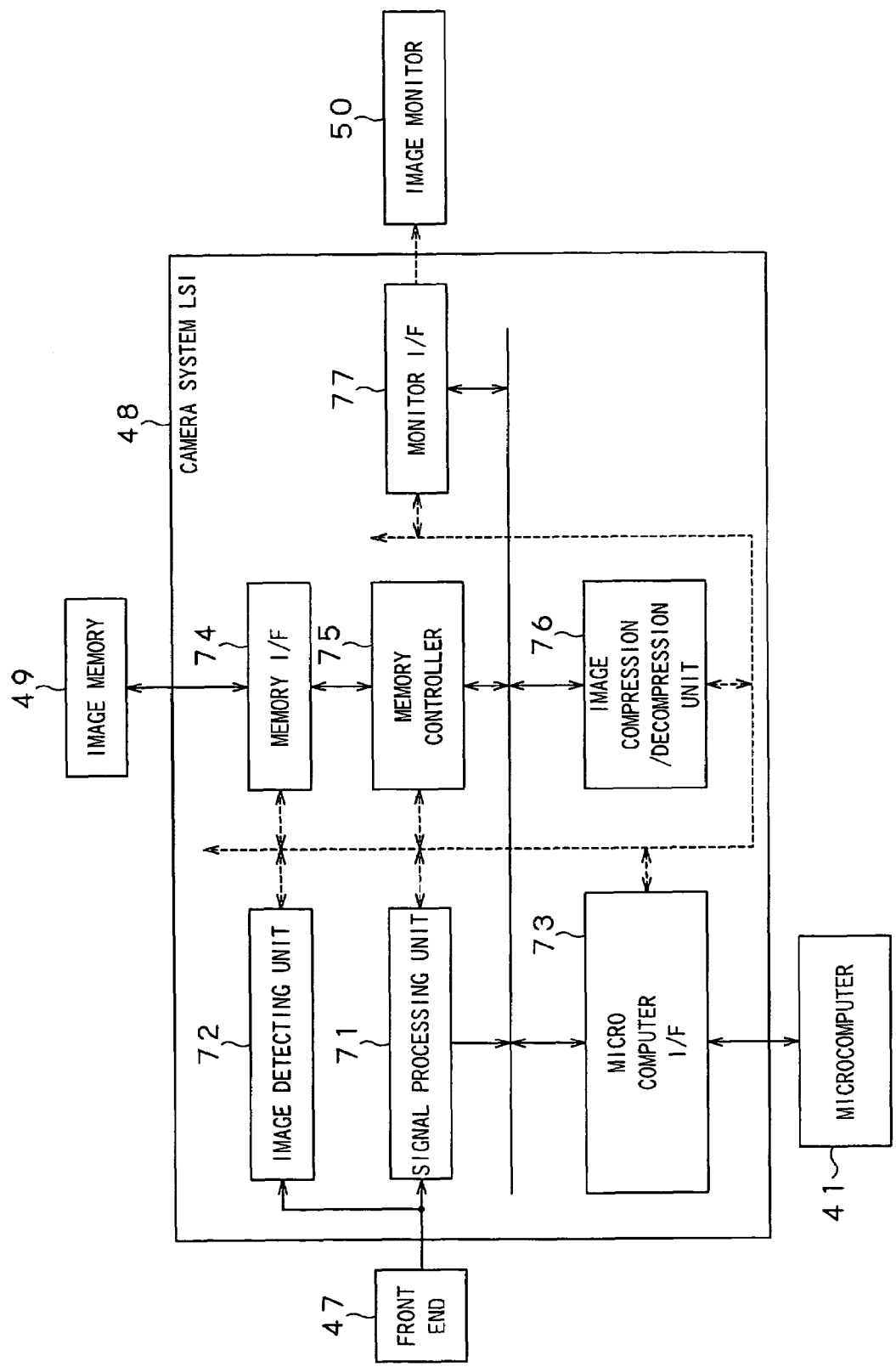
FIG. 9 is a block diagram showing a configuration example of camera system LSI that the image pick-up apparatus to which the present invention is applied has.

FIG. 9 is a block diagram showing a configuration example of the camera system LSI 48 shown in FIG. 5. Respective blocks constituting the camera system LSI 48 are controlled by the microcomputer 41 shown in FIG. 5 through a microcomputer interface (I/F) 73.

A signal processing unit 71 performs various processing such as interpolation processing, filtering processing, matrix operation processing, luminance signal generation processing and/or color difference signal generation processing, etc. with respect to four kinds of color information delivered from the front end 47 to output, e.g., generated image signal to the image monitor 50 through a monitor interface 77.

An image detecting unit 72 performs detection processing such as auto-focus, auto-exposure, and/or auto-white balance, etc. on the basis of output of the front end 47 to output the result thereof to the microcomputer 41 as occasion demands.

A memory controller 75 controls transmission/reception of data between processing blocks mutually, or transmission/reception of data between a predetermined processing block and the image memory 49 to output, e.g., image data delivered from the signal processing unit 71 to the image memory 49 through the memory interface 74 and to allow the image memory 49 to store such image data.

An image compression/decompression (extraction) unit 76 compresses, e.g., image data delivered from the signal processing unit 71 by the JPEG format to output data thus obtained to the external memory medium 51 through the microcomputer interface 73 to allow the external memory medium 51 to store such data. The image compression/decompression unit 76 further decompresses or extracts (expands) the compressed data which has been read out from the external memory medium 51 to output the data thus obtained to the image monitor 50 through the monitor interface 77.

Figure 10:
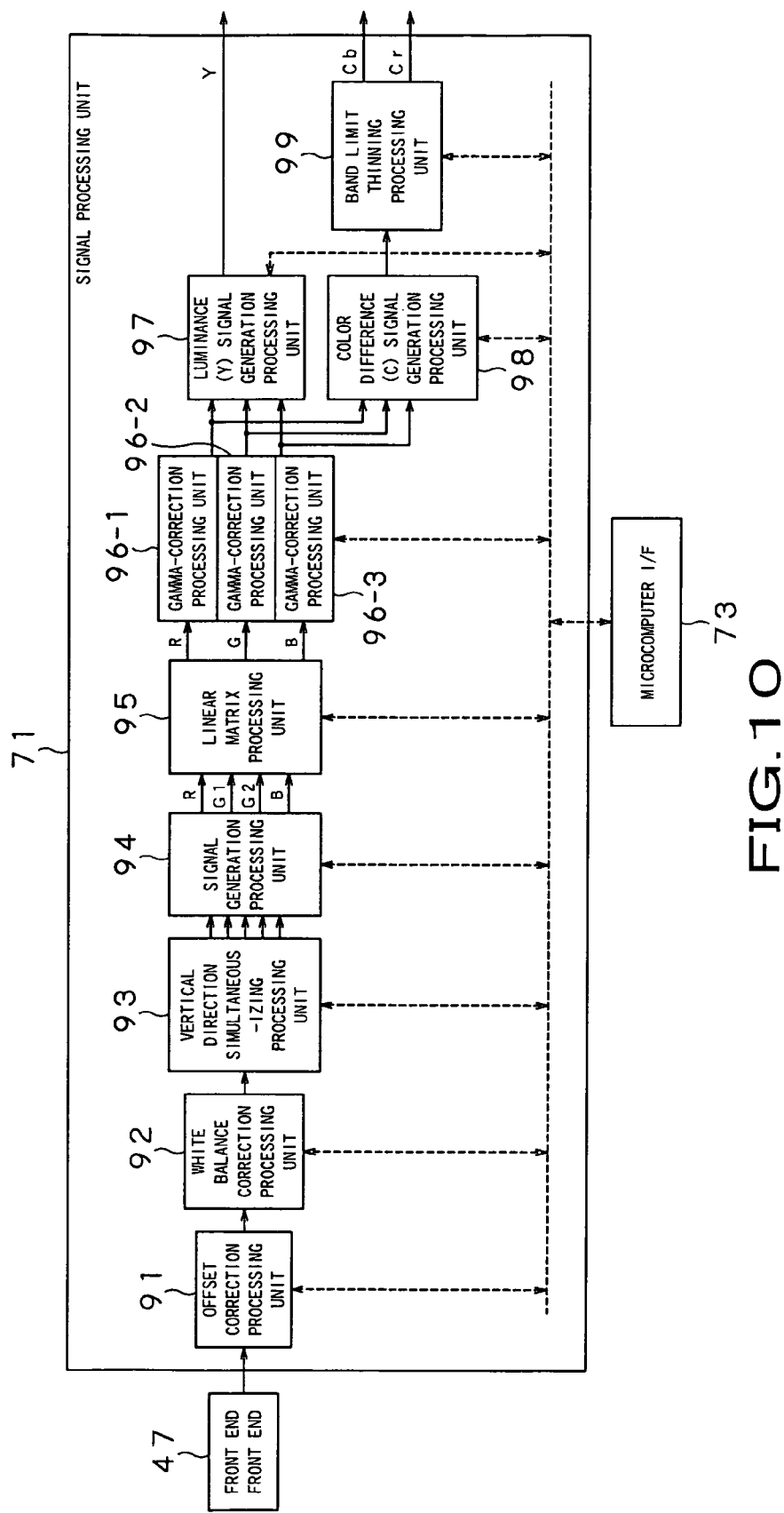
FIG. 10 is a block diagram showing a configuration example of signal processing unit of FIG. 9.

FIG. 10 is a block diagram showing the detailed configuration example of the signal processing unit 71 shown in FIG. 9. Respective blocks constituting the signal processing unit 71 are controlled by the microcomputer 41 through the microcomputer interface 73.

An offset correction processing unit 91 removes noise component (offset component) included in image signal delivered from the front end 47 to output the image signal thus obtained to a white balance correction processing unit 92. The white balance correction processing unit 92 serves to correct balance of respective colors on the basis of color temperatuere of image signal delivered from the offset correction processing unit 91 and differences between sensitivities of respective filters of the color filter 61 for four colors. A color signal acquired after undergone correction by the white balance correction processing unit 92 is outputted to a vertical direction simultaneousizing (synchronizing) processing unit 93. At the vertical direction simultaneous-izing processing unit 93, delay elements are provided. Thus, shifts of time in vertical direction of signals outputted from the white balance correction processing unit 92 (hereinafter referred to as RG1G2B signals) are simulataneous-ized or synchronized (corrected).

A signal generation processing unit 94 performs interpolation processing for interpolating color signal of 2×2 pixels of the minimum unit of RG1G2B signals delivered from the vertical direction simulataneous-izing processing unit 93 into phase of the same space, noise removal processing for removing noise component of signal, filtering processing for limiting signal band, and high frequency band correction processing for correcting high frequency band component of signal band, etc. to output the RG1G2B signals thus obtained to a linear matrix processing unit 95.

The linear matrix processing unit 95 performs operation (computation) of the RG1G2B signals by the formula (1) on the basis of predetermined linear matrix coefficients (matrix of 3×4) to generate RGB signals of three colors.

$$\begin{bmatrix} R \\ G \\ B \end{bmatrix} = \begin{bmatrix} a & b & c & d \\ e & f & g & h \\ i & j & k & l \end{bmatrix} \cdot \begin{bmatrix} R \\ G1 \\ G2 \\ B \end{bmatrix} \quad (1)$$

An R signal generated by the linear matrix processing unit 95 is outputted to a gamma-correction processing unit 96-1, a G signal is outputted to a gamma correction processing unit 96-2, and a B signal is outputted to a gamma-correction processing unit 96-3.

The gamma-correction processing units 96-1 to 96-3 perform gamma correction with respect to respective signals of RGB signals which have been outputted from the linear matrix processing unit 95 to output RGB signals thus acquired to a luminance (Y) signal generation processing unit 97 and a color difference (C) signal generation processing unit 98.

The luminance signal generation processing unit 97 synthesizes, at a predetermined synthesis ratio, RGB signals delivered from the gamma correction processing units 96-1 to 96-3 in accordance with, e.g., the formula (2) to generate a luminance signal (Y).

$$Y = 0.2126R + 0.7152G + 0.0722B \quad (2)$$

A color difference signal generation processing unit 98 similarly synthesizes, at a predetermined synthesis ratio, RGB signals delivered from the gamma correction processing units 96-1 to 96-3 to generate a color difference signal (C) to output the color difference signal (C) thus generated to a band limit thinning processing unit 99. The band limit thinning processing unit 99 generates color difference signals (Cb, Cr) on the basis of the color difference signal (C). It is to be noted that in a signal obtained by single chip 2×2 color coding, band of color information generally does not exist to such a degree that such band of color information exists in luminance signal. Accordingly, the band limit thinning processing unit 99 performs band limit processing and thinning processing with respect to color difference signal (C) delivered from the color signal generation processing unit 98 to thereby reduce color information data and to generate color difference signals (Cb, Cr).

A luminance signal (Y) generated by the luminance signal generation processing unit 97, and a color difference signal (C) generated by the color difference signal generation processing unit 98, or color difference signals (Cb, Cr) generated by the band limit thinning processing unit 99 are outputted to the image monitor 50 through, e.g., monitor interface 77 shown in FIG. 9.

In the image pick-up apparatus having the configuration as described above, in the case where photographing of image is instructed, the microcomputer 41 controls TG46 to take image thereinto by image sensor 45. Namely, rays of light of four colors are transmitted by color filter 61 for four colors formed at the front face of image pick-up devices such as CCD, etc. (hereinafter referred to as CCD image pick-up device) constituting the image sensor 45. The rays of light thus transmitted are taken in by the CCD image pick-up devices. The rays of light which have been taken in by the CCD image pick-up device are converted into color signals of four colors. The color signals thus obtained are outputted to the front end 47.

The front end 47 implements correlating double sampling processing for removing noise component, gain control processing, and digital convertion processing, etc. with respect to the color signal delivered from the image sensor 45 to output image data thus obtained to the camera system LSI 48.

At the signal processing unit 71 of the camera system LSI 48, offset component of color signal is removed by the offset correction processing unit 91, and balance of respective colors is corrected on the basis of color temperature of image signal and differences between sensitivities of respective filters of the color filter 61 for four colors by the white balance correction processing unit 92.

Moreover, shifts of time in vertical direction of signals corrected by the white balance correction processing unit 92 are simulataneous-ized or synchronized (corrected) by the vertical direction simulataneous-izing processing unit 93, and interpolation processing for interpolating color signal of 2×2 pixels of the minimum unit of RG1G2B signals delivered from the vertical direction simultaneousizing processing unit 93 into the phase of the same space, noise removal processing for removing noise component of signal, filtering processing for limiting signal band, and high frequency band correction processing for correcting high frequency component of signal band, etc. are performed by the signal generation processing unit 94.

Further, at the linear matrix processing unit 95, signals generated by the signal generation processing unit 94 (RG1G2B signals) are transformed on the basis of predetermined linear matrix coefficients M (matrix of 3×4). Thus, RGB signals of three colors are generated. An R signal generated by the linear matrix processing unit 95 is outputted to gamma-correction processing unit 96-1, a G signal is outputted to the gamma-correction processing unit 96-2, and a B signal is outputted to the gamma-correction processing unit 96-3.

Gamma-correction is performed, by the gamma correction processing units 96-1 to 96-3, with respect to respective signals of RGB signals obtained by processing of the linear matrix processing unit 95. The RGB signals thus acquired are outputted to the luminance signal generation processing unit 97 and the color difference signal generation unit 98. At the luminance signal generation processing unit 97 and the color difference signal generation processing unit 98, respective signals of R signal, G signal and B signal which are delivered from the gamma-correction processing units 96-1 to 96-3 are synthesized at a predetermined synthesis ratio. Thus, luminance signal (Y) and color difference signal (C) are generated. The luminance signal (Y) generated by the luminance signal generation processing unit 97, and the color difference signal (C) generated by the color difference signal generation processing 98 are outputted to the image compression/extraction unit 76 of FIG. 9, and are compressed by, e.g., the JPEG format. The image data thus obtained after undergone compression are outputted to the external memory medium 51 through the microcomputer interface 73, and are stored therein.

Since one image data is formed on the basis of four kinds of color signals in a manner as stated above, the reproduction characteristic thereof results in that closer to seeing of the eye of the human being.

On the other hand, when reproduction (display) of image data stored in the external memory medium 51 is instructed, image data stored in the external memory medium 51 is read out by the microcomputer 41. The image data which has been thus read out is outputted to the image compression/extraction unit 76 of the camera system LSI 48. At the image compression/extraction unit 76, compressed image data is expanded. Thus, image corresponding to obtained data is displayed on the image monitor 50 through monitor interface 77.

Figure 11:
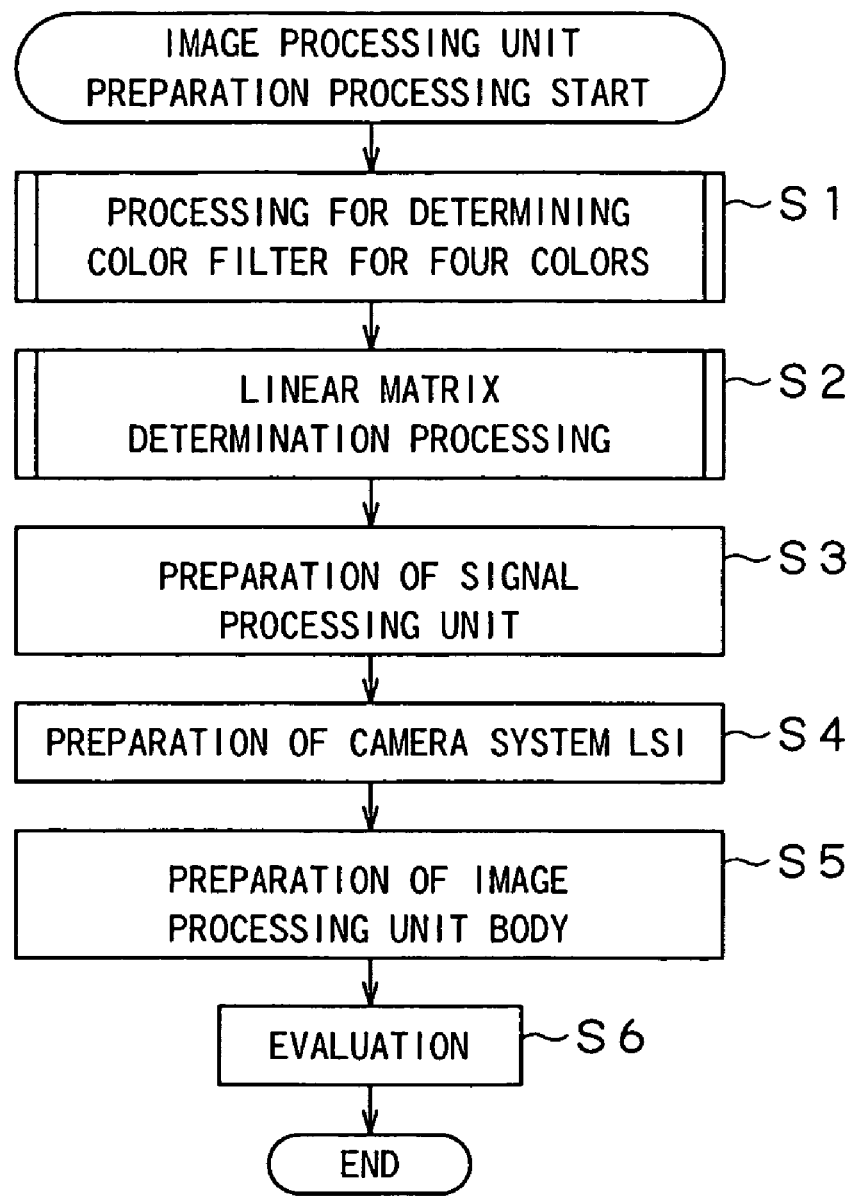
FIG. 11 is a flowchart for explaining preparation processing of image processing unit.

Then, processing (procedure) for preparing the image pick-up apparatus having the configuration as described above will be explained with reference to the flowchart shown in FIG. 11.

At step S1, processing for determining color filter for four colors, which determines spectral sensitivity characteristics of the color filter 61 for four colors provided at the image sensor 45 shown in FIG. 5, is performed. At step S2, linear matrix coefficient M determination processing for determining matrix coefficients M, which are set at the linear matrix processing unit 95 shown in FIG. 10, is performed. The detail of the processing for determining color filter for four colors, which is executed at the step S1, will be described later with reference to the flowchart shown in FIG. 12, and the detail of the processing for determining linear matrix coefficients M, which is executed at step S2, will be described later with reference to the flowchart shown in FIG. 16.

After color filter 61 for four colors is determined so that matrix coefficients are determined, signal processing unit 71 shown in FIG. 10 is prepared at step S3. Thus, processing proceeds to step S4, at which camera system LSI 48 shown in FIG. 9 is prepared. Moreover, at step S5, the entirety of the image pick-up apparatus (e.g., digital camera) as shown in FIG. 5 is prepared. At step S6, evaluation of picture quality ("color reproduction characteristic", "color discriminating characteristic") of the image pick-up apparatus prepared at the step S5 is performed. Thus, processing is completed.

Here, object color referred in evaluating "color reproduction characteristic" and "color discriminating characteristic", etc. will be explained. The object color is calculated by value obtained by integrating, within the range of visible light range (e.g., 400 to 700 nm), product of "spectral reflection factor of object", "spectral energy distribution of standard illumination", and "spectral sensitivity distribution (characteristic) of sensor for sensing object (color filter)". Namely, the object color is calculated by the formula (3).

$$\text{Object color} = k \int_{vis} (\text{spectral reflection factor of object}) \cdot (\text{spectral energy distribution of illumination}) \cdot (\text{spectral sensitivity distribution of sensor for sensing object}) d\lambda \quad (3)$$

$\lambda$: wavelength vis: visible light region (ordinarily 400 nm to 700 nm)

For example, in the case of observing a predetermined object by the eye, "spectral sensitivity characteristic of the sensor" of the formula (3) is represented by color matching function, and object colors of that object are represented by three stimulation values of X, Y, Z. In concrete terms, value of X is calculated by the formula (4-1), value of Y is calculated by the formula (4-2), and value of Z is calculated by the formula (4-3). It is to be noted that values of constant k in the formulas (4-1) to (4-3) are calculated by the formula (4-4).

$$X = k \int_{vis} R(\lambda) \cdot P(\lambda) \cdot \bar{x}(\lambda) d\lambda \quad (4-1)$$

$$Y = k \int_{vis} R(\lambda) \cdot P(\lambda) \cdot \bar{y}(\lambda) d\lambda \quad (4-2)$$

$$Z = k \int_{vis} R(\lambda) \cdot P(\lambda) \cdot \bar{z}(\lambda) d\lambda \quad (4-3)$$

$R(\lambda)$: spectral reflection factor of object $\bar{x}(\lambda), \bar{y}(\lambda), \bar{z}(\lambda)$: color matching function $$k = 1 / \int P(\lambda) \cdot \bar{y}(\lambda) d\lambda \quad (4-4)$$

Moreover, in the case where image of a predetermined object is taken thereinto by the image pick-up apparatus such as digital camera, etc., "spectral sensitivity characteristic of sensor" of the formula (3) is represented by the spectral sensitivity characteristic of the color filter, and object color of that object of color value (RGB value (ternary), e.g., in the case of RGB filters. (three kinds)) is calculated. In the case where RGB filter for detecting three kinds of colors is provided at the image pick-up apparatus, value of R is calculated by the formula (5-1), value of G is calculated by the formula (5-2), and value of B is calculated by the formula (5-3) in practical sense. Moreover, value of constant $k_r$ in the formula (5-1) is calculated by the formula (5-4), value of constant $k_g$ in the formula (5-2) is calculated by the formula (5-5), and value of constant $k_b$ in the formula (5-3) is calculated by the formula (5-6).

$$R = k_r \int_{vis} R(\lambda) \cdot P(\lambda) \cdot \bar{r}(\lambda) d\lambda \quad (5-1)$$

$$G = k_g \int_{vis} R(\lambda) \cdot P(\lambda) \cdot \bar{g}(\lambda) d\lambda \quad (5-2)$$

$$B = k_b \int_{vis} R(\lambda) \cdot P(\lambda) \cdot \bar{b}(\lambda) d\lambda \quad (5-3)$$

$\bar{r}(\lambda), \bar{g}(\lambda), \bar{b}(\lambda)$: spectral sensitivity distribution of color filter $$k_r = 1 / \int_{vis} P(\lambda) \cdot \bar{r}(\lambda) d\lambda \quad (5-4)$$

$$k_g = 1 / \int_{vis} P(\lambda) \cdot \bar{g}(\lambda) d\lambda \quad (5-5)$$

$$k_b = 1 / \int_{vis} P(\lambda) \cdot \bar{b}(\lambda) d\lambda \quad (5-6)$$

Then, the processing for determining color filter for four colors, which is performed at the step S1 shown in FIG. 11, will be explained with reference to the flowchart shown in FIG. 12.

It is to be noted that while various methods exist as the method for determining color filter for four colors, explanation will be given in connection with the processing in which, e.g., RGB filter is caused to be base (one of existing (FIG. 1) G filters is caused to be G1 filter), and G2 filter for allowing color having high correlation with respect to color transmitted through the G1 filter to be transmitted therethrough is selected to supplement the G2 filter thus to determine color filter for four colors.

At step S21, color target used for calculating UMG value is selected. For example, at step S21, there is selected color target in which many color patches representing existing colors are included and many color patches where importance is attached to memory color of the human being (skin color, green of plant, blue of sky, etc.) are included. As color target, there is, e.g., IT8.7, Macbeth Color Checker, GretargMacbeth DigitalCamera Color Checker, CIE, Color Bar, etc.

Moreover, according to the object, color patch which can serve as standard may be prepared from data such as SOCS (Standard Object Color Spectra Database), etc. to use the color patch thus prepared. It is to be noted that the detail of the SOCS is disclosed in 'Johji Tajima, "Statistical Color Reproduction Evaluation by Standard Object Color Spectra Database (SOCS)", Color forum JAPAN 99'. Explanation will be given below in connection with the case where Machbeth Color Checker is selected as color target.

Figure 13:
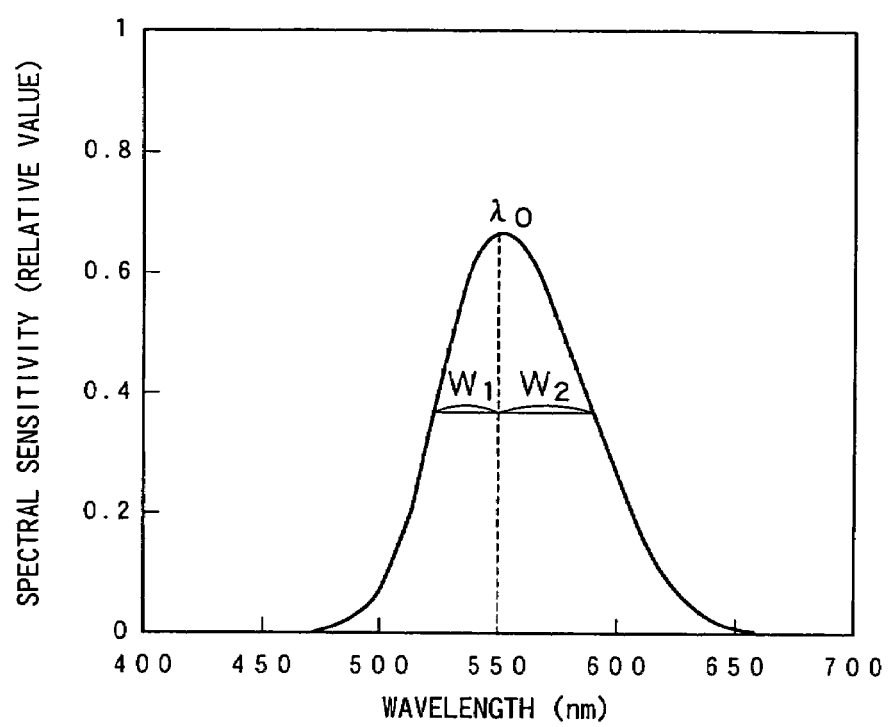
FIG. 13 is a view showing an example of virtual curve.

At step S22, spectral sensitivity characteristic of G2 filter is determined. As the spectral sensitivity characteristic, there may be used spectral sensitivity characteristic which can be prepared from existing material, or there may be used spectral sensitivity characteristic obtained by assuming virtual curve $C(\lambda)$ by cubic spline curve (cubic spline function) as shown in FIG. 13 to change peak value $\lambda_0$ of virtual curve $C(\lambda)$, value w (value obtained by dividing sum of $w_1$ and $w_2$ by 2) and value $\Delta w$ (value obtained by dividing value obtained by subtracting $w_2$ from $w_1$ by 2) within the range shown. It is to be noted that values of w and $\Delta w$ are set to values based on value of half-value width. As a method of changing $\lambda_0$, w, $\Delta w$, those values are assumed to be changed at pitch of e.g., 5 nm. The virtual curves $C(\lambda)$ are represented by the following formulas (6-1) to (6-5) within respective ranges.

$$C(\lambda) = \frac{w_2^3 + 3w_2^2(w_2 - |\lambda - \lambda_0|) + 3w_2(w_2 - |\lambda - \lambda_0|)^2 - 3(w_2 - |\lambda - \lambda_0|)^3}{6w_2^3} \wedge 0 \leq \lambda - \lambda_0 \leq w_2 \quad (6\text{-}1)$$

$$C(\lambda) = \frac{w_1^3 + 3w_1^2(w_1 - |\lambda - \lambda_0|) + 3w_1(w_1 - |\lambda - \lambda_0|)^2 - 3(w_1 - |\lambda - \lambda_0|)^3}{6w_1^3} \wedge -w_1 \leq \lambda - \lambda_0 \leq 0 \quad (6\text{-}2)$$

$$C(\lambda) = \frac{(2w_2 - |\lambda - \lambda_0|)^3}{6w_2^3} \wedge w_2 \leq \lambda - \lambda_0 \leq 2w_2 \quad (6\text{-}3)$$

$$C(\lambda) = \frac{(2w_1 - |\lambda - \lambda_0|)^3}{6w_1^3} \wedge -2w_1 \leq \lambda - \lambda_0 \leq -w_1 \quad (6\text{-}4)$$

$$C(\lambda) = 0 \wedge \text{except for the above range} \quad (6\text{-}5)$$

Figure 1:
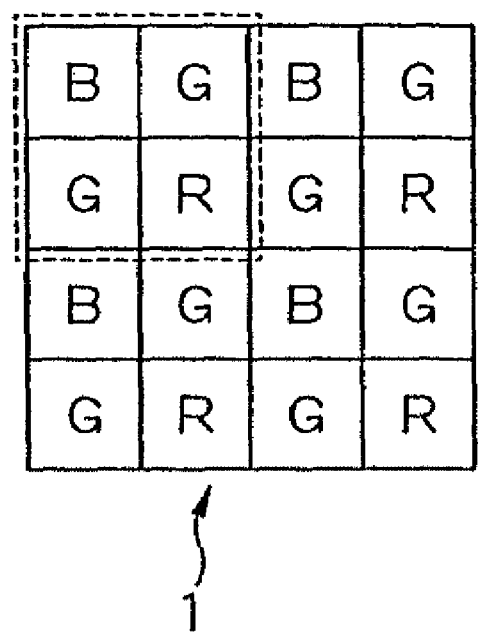
FIG. 1 is a view showing an example of conventional RGB color filter.

It should be noted that although only filter G2 is supplemented in this example, only R filter and B filter of filter (R, G, G, B) shown in FIG. 1 may be used to define the remaining two G1, G2 filters as virtual curve of the above-mentioned formulas (6-1) to (6-5) in the vicinity of green color. Moreover, similarly, only R and G, and only G and B may be used from the filter shown in FIG. 1. Further, among filters for four colors, filters for three colors may be defined as virtual curve, and filters for four colors may be defined all as virtual curve.

At step S23, filter to be supplemented (G2 filter) and existing filters (R filter, G1 filter, B filter) are combined so that the minimum unit (set) of color filters for four colors is prepared. Moreover, at step S24, UMG is used as filter evaluation coefficients with respect to color filter for four colors prepared at the step S23. Thus, UMG value is calculated.

As explained with reference to FIG. 8, in the case where UMG is used, evaluation can be performed at a time with respect to respective color filters for four colors. Moreover, not only evaluation is performed by taking into consideration spectral reflection factor of object, but also evaluation is made by taking into consideration reduction characteristic of noise. Since high evaluation is indicated with respect to filters having suitable overlap in spectral sensitivity characteristics of respective filters in the evaluation using UMG, it is possible to suppress that high evaluation is indicated with respect to, e.g., filter having the characteristic in which the characteristic of R and the characteristic of G overlap with each other over a broad wavelength band (filter in which noise is amplified when respective color signals are separated).

Figure 14:
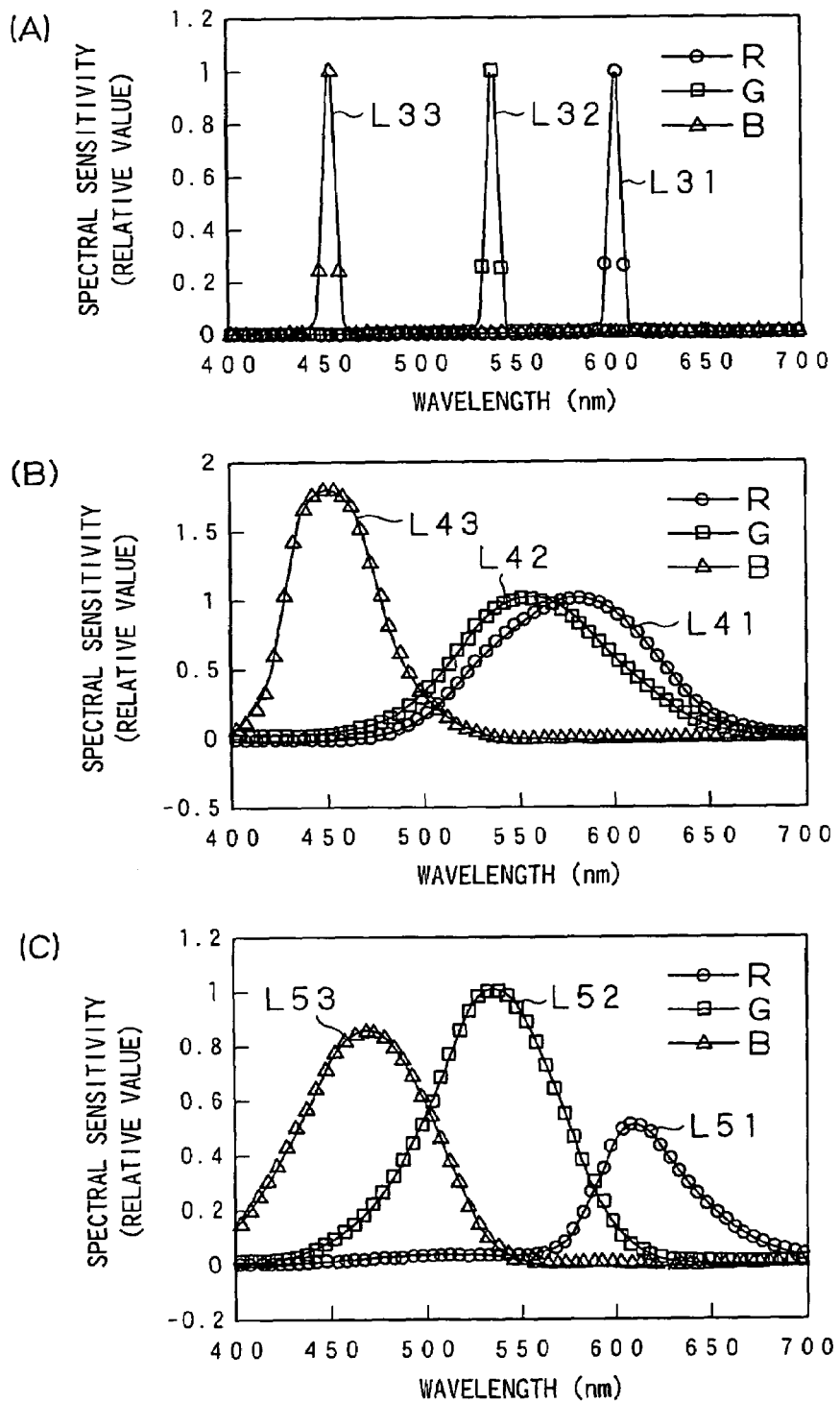
FIGS. 14(A) to 14(C) are views showing examples of UMG value every filter.

FIG. 14 is a view showing example of UMG value calculated at the color filter for three colors. For example, in the filter having the characteristic as shown in FIG. 14(A) in which characteristics of RGB do not overlap with each other, UMG value of "0.7942" is calculated. In the filter having the characteristic as shown in FIG. 14(B) in which characteristic of R and characteristic of G overlap with each other over a broad wavelength band, UMG value of "0.8211" is calculated. Moreover, in the filter having the characteristic as shown in FIG. 14(C) in which respective characteristics of RGB suitably overlap with each other, UMG value of "0.8879" is calculated. Namely, the highest evaluation is indicated with respect to the filter having the characteristic as shown in FIG. 14(C) in which respective characteristics of RGB suitably overlap with each other. This similarly applies also to color filter for four colors. In this example, curve L31 shown in FIG. 14(A), curve L41 shown in FIG. 14(B) and curve L51 shown in FIG. 14(C) represent spectral sensitivity of R, curve L32 shown in FIG. 14(A), curve L42 shown in FIG. 14(B) and curve L52 shown in FIG. 14(C) represent spectral sensitivity of G, and curve L33 shown in FIG. 14(A), curve L43 shown in FIG. 14(B) and curve L53 shown in FIG. 14(C) represents spectral sensitivity of B.

At step S25, whether or not UMG value calculated at step S24 is "0.95" which is predetermined threshold value or more is judged. In the case where it is judged that the UMG value is less than "0.95", processing proceeds to step S26 so that the prepared color filter for four colors is rejected (is not used). At step S26, in the case where color filter for four colors is rejected, the processing is completed thereafter (processing of the step S2 shown in FIG. 11 and those subsequent thereto are not executed).

On the other hand, at the step S25, in the case where it is judged that UMG value calculated at the step S24 is "0.95" or more, that color filter for four colors is caused to be candidate filter used in the digital camera at step S27.

Whether or not the color filter for four colors caused to be candidate filter at the step S27 can be realized by existing material/dye is judged at step S28. In the case where it is difficult to acquire material/dye, etc., it is judged that such color filter cannot be realized. Processing proceeds to step S26. As a result, the color filter for four colors is rejected.

On the other hand, in the case where it is judged that material/dye, etc. can be acquired so that such color filter can be realized, processing proceeds to step S29. Thus, the color filter for four colors thus prepared is determined as filter used in the digital camera. Thereafter, processing of step S2 shown in FIG. 11 and those subsequent thereto are executed.

Figure 15:
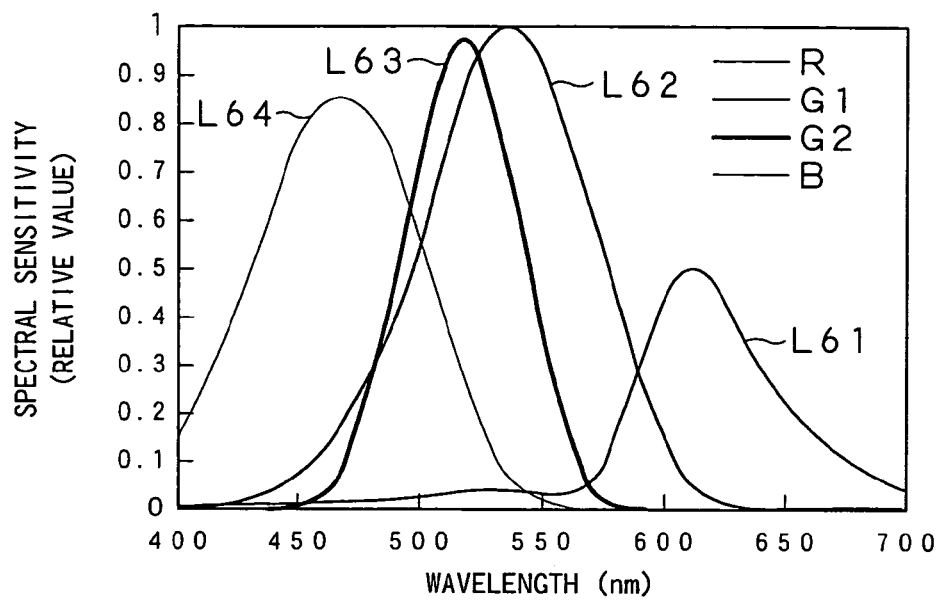
FIG. 15 is a view showing an example of spectral sensitivity characteristic of color filter for four colors.

FIG. 15 is a view showing an example of spectral sensitivity characteristic of color filter for four colors which has been determined at step S29.

In FIG. 15, curve L61 represents spectral sensitivity of R, and curve L62 represents spectral sensitivity of G1. Moreover, curve L63 represents spectral sensitivity of G2, and curve L64 represents spectral sensitivity of B. As shown in FIG. 15, the spectral sensitivity curve of G2 (curve L63) has high correlation with respect to the spectral sensitivities curve of G1 (curve L62). Further, spectral sensitivity of R, spectral sensitivity of G (G1, G2) and spectral sensitivity of B overlap with each other within suitable range.

By utilizing the color filter for four colors determined in a manner as stated above, it becomes possible to improve particularly "discriminating characteristic of color" of "color reproduction characteristic".

It is to be noted that it is preferable that filter having high correlation with respect to G filter of the existing RGB filter is caused to be filter to be supplemented (G2 filter) in a manner as stated above from viewpoint of utilization efficiency of light. In this case, it is desirable that peak value of the spectral sensitivity curve of filter to be supplemented experimentally exists within the range from 495 to 535 nm (in the vicinity of peak value of the spectral sensitivity curve of the existing G filter).

Moreover, in the case where filter having high correlation with respect to the existing G filter, since either one of two G filter constituting the minimum unit (R, G, G, B) shown in FIG. 1 is only caused to be filter of color to be supplemented to thereby have ability to prepare color filter four colors, there is no necessity to greatly change production process step.

In the case where color filter for four colors is prepared in a manner as stated above and the color filter thus prepared is provided at the digital camera, since four kinds of color signals are delivered from the signal generation processing unit 94 at the signal processing unit 71 shown in FIG. 10, transform processing for generating signals of three colors (R, G, B) from signals of four colors (R, G1, G2, B) is performed at the linear matrix processing unit 95. Since this transform processing is matrix processing with respect to luminous linear (luminance value can be represented by linear transform processing) input signal value, transform processing performed at the linear matrix processing unit 95 will be called linear matrix processing hereinafter as occasion demands.

Figure 16:
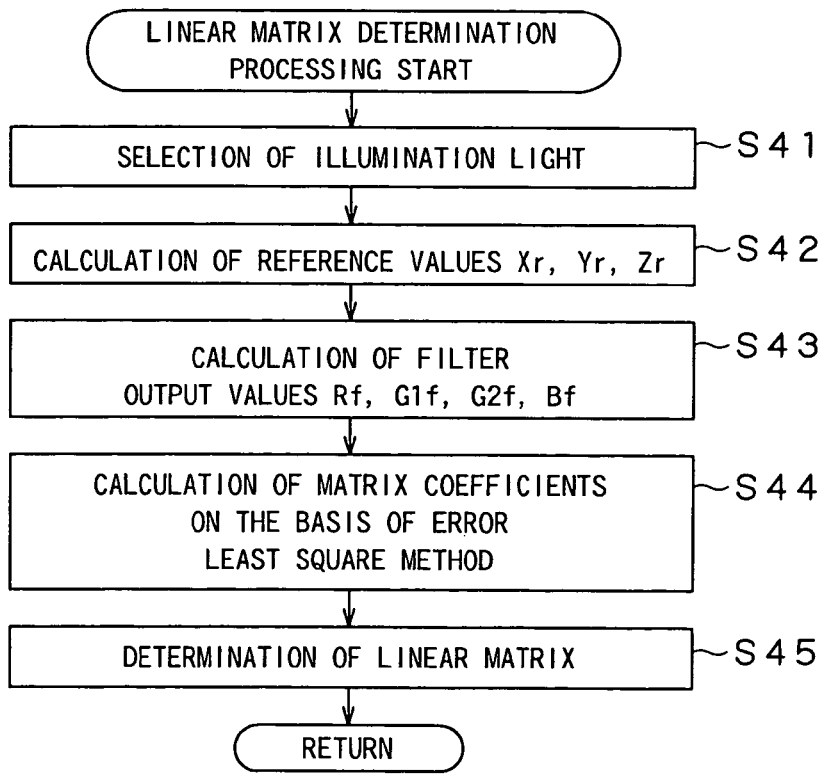
FIG. 16 is a flowchart for explaining the detail of linear matrix determination processing of step S2 of FIG. 11.

Then, the linear matrix coefficient M determination processing, which is executed at the step S2 shown in FIG. 11, will be explained with reference to the flowchart shown in FIG. 16. It is to be noted that color target used in the linear matrix coefficient M determination processing is caused to be Macbeth Color Checker, and the color filter for four colors used is caused to have spectral sensitivity characteristic shown in FIG. 15.

At step S41, e.g., general day light D65 (illumination light $L(\lambda)$) used as standard light source in CIE (Commision Internationaledel'Eclairange) is selected as illumination light. It is to be noted that the illumination light may be changed into illumination light, etc. of the environment where it is expected that the image processing apparatus is frequently used. Further, in the case where plural illumination environments assumed exist, it is conceivable to prepare plural linear matrices. The case where the day light D65 is selected as illumination light will now be explained.

At step S42, reference values Xr, Yr, Zr are calculated. In concrete terms, the reference value Xr is calculated by the formula (7-1), the reference value Yr is calculated by the formula (7-2), and the reference value Zr is calculated by the formula (7-3).

$$X_r = k \int_{vis} R(\lambda) \cdot L(\lambda) \cdot \bar{x}(\lambda) d\lambda \qquad (7\text{-}1)$$

$$Y_r = k \int_{vis} R(\lambda) \cdot L(\lambda) \cdot \bar{y}(\lambda) d\lambda \qquad (7\text{-}2)$$

$$Z_r = k \int_{vis} R(\lambda) \cdot L(\lambda) \cdot \bar{z}(\lambda) d\lambda \qquad (7\text{-}3)$$

$R(\lambda)$: spectral reflection factor of object $\bar{x}(\lambda), \bar{y}(\lambda), \bar{z}(\lambda)$: color matching function Moreover, constant k is calculated by the formula (8).

$$k = 1/\int_{vis} L(\lambda) \cdot y(\lambda) d\lambda \qquad (8)$$

For example, in the case where color target is Macbeth Color Checker, reference values corresponding to 24 colors are calculated.

Then, at step S43, output values $R_f$, $G1_f$, $G2_f$, $B_f$ of color filters for four colors are calculated. In concrete terms, $R_f$ is calculated by the formula (9-1), $G1_f$ is calculated by the formula (9-2), $G2_f$ is calculated by the formula (9-3), and $B_f$ is calculated by the formula (9-4).

$$R_f = k_r \int_{vis} R(\lambda) \cdot L(\lambda) \cdot \bar{r}(\lambda) d\lambda \qquad (9\text{-}1)$$

$$G1_f = k_{g1} \int_{vis} R(\lambda) \cdot L(\lambda) \cdot \overline{g1}(\lambda) d\lambda \qquad (9\text{-}2)$$

$$G2_f = k_{g2} \int_{vis} R(\lambda) \cdot L(\lambda) \cdot \overline{g2}(\lambda) d\lambda \qquad (9\text{-}3)$$

$$B_f = k_b \int_{vis} R(\lambda) \cdot L(\lambda) \cdot \bar{b}(\lambda) d\lambda \qquad (9\text{-}4)$$

$\bar{r}(\lambda), \overline{g1}(\lambda), \overline{g2}(\lambda), \bar{b}(\lambda)$: spectral sensitivity distribution of color filter Moreover, constant $k_r$ is calculated by the formula (10-1), constant $K_{g1}$ is calculated by the formula (10-2), constant $K_{g2}$ is calculated by the formula (10-3), and constant $k_b$ is calculated by the formula (10-4).

$$k_r = 1/\int_{vis} L(\lambda) \cdot \bar{r}(\lambda) d\lambda \qquad (10\text{-}1)$$

$$k_{g1} = 1/\int_{vis} L(\lambda) \cdot \overline{g1}(\lambda) d\lambda \qquad (10\text{-}2)$$

$$k_{g2} = 1/\int_{vis} L(\lambda) \cdot \overline{g2}(\lambda) d\lambda \qquad (10\text{-}3)$$

$$k_b = 1/\int_{vis} L(\lambda) \cdot \bar{b}(\lambda) d\lambda \qquad (10\text{-}4)$$

For example, in the case where color target is Macbeth Color Checker, output values $R_f$, $G1_f$, $G2_f$, $B_f$ corresponding to 24 colors are calculated.

At step S44, matrix for performing transform processing to approximate filter output value calculated at the step S43 into reference values $(XYZ_{ref})$ calculated at the step S42 is calculated by, e.g., error least square method in the XYZ color space.

For example, in the case where matrix of 3×4 to be calculated is assumed to be A represented by the formula (11), matrix transform $(XYZ_{exp})$ is represented by the following formula (12).

$$A = \begin{bmatrix} a0 & a2 & a3 & a4 \\ a4 & a5 & a6 & a7 \\ a8 & a9 & a10 & a11 \end{bmatrix} \qquad (11)$$

-continued $$XYZ \exp = \begin{bmatrix} \hat{X} \\ \hat{Y} \\ \hat{Z} \end{bmatrix} = \begin{bmatrix} a0 & a2 & a3 & a4 \\ a4 & a5 & a6 & a7 \\ a8 & a9 & a10 & a11 \end{bmatrix} \cdot \begin{bmatrix} R_f \\ G1_f \\ G2_f \\ B_f \end{bmatrix} \quad (12)$$

Moreover, square (E2) of error of matrix transform (formula (12)) with respect to the reference value is represented by the following formula (13). On the basis of this value, matrix A which minimizes error of matrix transform with respect to reference value is calculated.

$$E^2 = |XYZref - XYZ\exp|^2 \quad (13)$$

Further, color space used in the error least square method may be changed into color space except for XYZ color space. For example, there may be performed transform processing into Lab, Luv, Lch color spaces even with respect to sensory perception of the human being (perceptive uniform color space) thereafter to perform similar operation, thereby making it possible to calculate linear matrix which permits reproduction of color less in perceptive error. It is to be noted that since these values of color space are calculated from XYZ values by non-linear transform processing, non-linear calculation algorithm is used also in the error least square method.

By operation as described above, matrix coefficients represented by the formula (14) are calculated as matrix coefficients with respect to filter having spectral sensitivity characteristic shown in FIG. 15, for example.

$$A = \begin{bmatrix} 0.476 & 0.905 & 0.261 & -0.691 \\ 0.2 & 1.154 & -0.061 & -0.292 \\ -0.004 & 0.148 & 0.148 & -0.481 \end{bmatrix} \quad (14)$$

At step S45, linear matrix is determined. For example, in the case where final RGB image data to be prepared is assumed to be represented by the following formula (15), linear matrix (LinearM) is calculated in a manner as described below.

$$RGBout = [R_0, G_0, B_0]^t \quad (15)$$

Namely, in the case where illumination light is D65, transform expression to transform sRGB color space into XYZ color space is represented by the formula (16) including ITU-R709.BT matrix, and the formula (17) is calculated by inverse matrix of the ITU-R709.BT matrix.

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \cdot \begin{bmatrix} R_{sRGB} \\ G_{sRGB} \\ B_{sRGB} \end{bmatrix} \quad (16)$$

$$\begin{bmatrix} R_{sRGB} \\ G_{sRGB} \\ B_{sRGB} \end{bmatrix} = \begin{bmatrix} 3.2406 & -1.5372 & -0.4986 \\ -0.9689 & 1.8758 & 0.0415 \\ 0.0557 & -0.204 & 1.057 \end{bmatrix} \cdot \begin{bmatrix} X \\ Y \\ Z \end{bmatrix} \quad (17)$$

By the matrix transform expression of the formula (12), and inverse matrix of ITU-R709.BT matrix of the formulas (15) and (17), the formula (18) is calculated. In the right side of the formula (18), there are included inverse matrix of ITU-R709.BT matrix and linear matrix as value multiplied by the above-described matrix A.

$$\begin{bmatrix} R_0 \\ G_0 \\ B_0 \end{bmatrix} = \begin{bmatrix} 3.2406 & -1.5372 & -0.4986 \\ -0.9689 & 1.8758 & 0.0415 \\ 0.0557 & -0.204 & 1.057 \end{bmatrix} \cdot \begin{bmatrix} a0 & a2 & a3 & a4 \\ a4 & a5 & a6 & a7 \\ a8 & a9 & a10 & a11 \end{bmatrix} \cdot \begin{bmatrix} R_f \\ G1_f \\ G2_f \\ B_f \end{bmatrix} \quad (18)$$

Namely, linear matrix (LinearM) of 3×4 is represented by the formula (19-1). Linear matrix with respect to color filter for four colors having spectral distribution characteristic shown in FIG. 15 in which, e.g., matrix coefficients of the formula (14) are used is represented by the formula (19-2).

$$LinearM = \begin{bmatrix} l a & l2 & l3 & l4 \\ l4 & l5 & l6 & l7 \\ l8 & l9 & l10 & l11 \end{bmatrix} \quad (19\text{-}1)$$

$$= \begin{bmatrix} 3.2406 & -1.5372 & -0.4986 \\ -0.9689 & 1.8758 & 0.0415 \\ 0.0557 & -0.204 & 1.057 \end{bmatrix} \cdot \begin{bmatrix} a0 & a2 & a3 & a4 \\ a4 & a5 & a6 & a7 \\ a8 & a9 & a10 & a11 \end{bmatrix}$$

$$LinearM = \begin{bmatrix} 1.238 & 1.084 & 0.228 & -1.55 \\ -0.087 & 1.295 & -0.309 & 0.101 \\ -0.018 & -0.029 & 1.535 & -0.485 \end{bmatrix} \quad (19\text{-}2)$$

Figure 2:
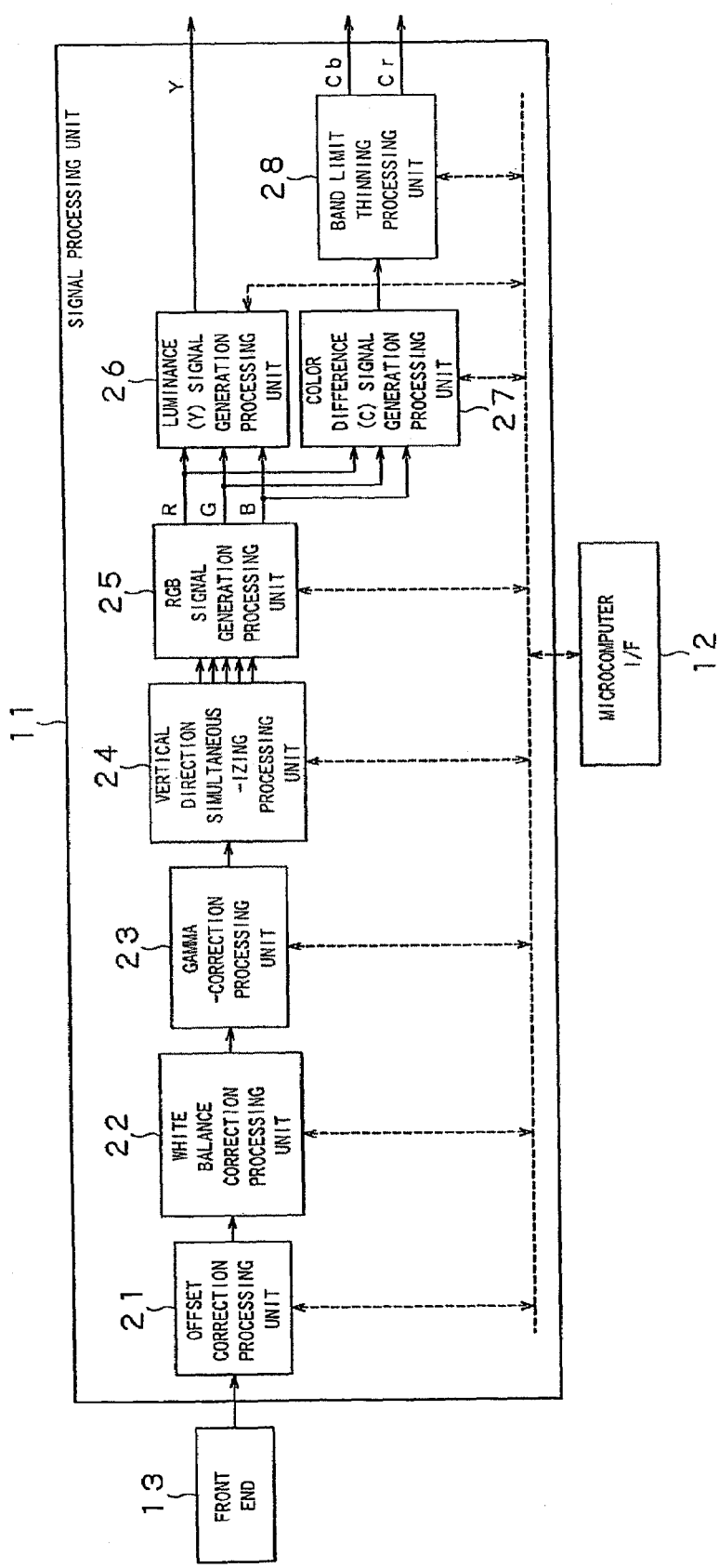
FIG. 2 is a block diagram showing a configuration example of signal processing unit provided in a conventional image pick-up apparatus.
Figure 3:
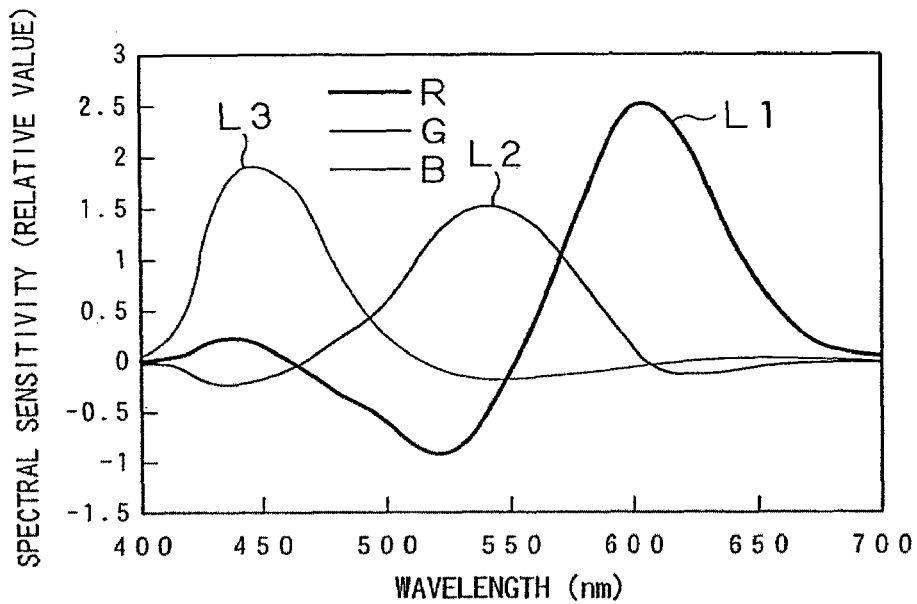
FIG. 3 is a view showing an example of spectral sensitivity characteristic.

The linear matrix calculated in a manner as described above is delivered to linear matrix processing unit 95 shown in FIG. 10. Thus, since it is possible to perform matrix processing with respect to signals (R, G1, G2, B) in which luminance can be represented by linear transform, it is possible to reproduce color having higher fidelity from a viewpoint of color engineering as compared to the case where matrix processing is performed with respect to signal obtained after gamma processing is implemented as in the case of processing at the signal processing unit 11 shown in FIG. 2.

Then, evaluation performed at step S6 shown in FIG. 11 will be explained.

In the case where comparison between color reproduction characteristic of the image pick-up apparatus provided with color filter for four colors having, e.g., spectral sensitivity characteristic shown in FIG. 15 which have been prepared in a manner as stated above and color reproduction characteristic of the image processing unit provided with color filter for three colors shown in FIG. 1 is performed, difference as described below appears.

For example, color differences at Lab color space between output values when image of Macbeth chart is picked up by two kinds of image input apparatuses (image pick-up apparatus provided with color filter for four colors and image pick-up apparatus provided with color filter for three colors) and reference values are respectively calculated by the following formula (20).

$$\Delta E = \sqrt{(L_1 - L_2)^2 + (a_1 - a_2)^2 + (b_1 - b_2)^2} \quad (20)$$

$L_1$-$L_2$ indicates lightness difference between two samples, and $a_1$-$a_2$, $b_1$-$b_2$ indicate component difference of hue/saturation of two samples.

FIG. 17 is a view showing calculation result by the formula (20). As shown in FIG. 17, in the case of the image pick-up apparatus provided with color filter for three colors, color difference is "3.32", whereas in the case of the image pick-up apparatus provided with color filter for four colors, color difference is "1.39". "Way of seeing of color" at the image pick-up apparatus provided with color filter for four colors is more excellent (color difference is small).

In FIG. 18, R value of object R1 is set to "49.4", G value thereof is set to "64.1" and B value thereof is set to "149.5", and R value of object R2 is set to "66.0", G value thereof is set to "63.7" and B value thereof is set to "155.6". Accordingly, in the color filter for four colors, RGB values of the object R1 and those of the object R2 become values different from each other. Similarly to the case where object is seen by the eye, colors of respective objects are discriminated. Namely, filter capable of discriminating between four kinds of colors is provided so that "discriminating characteristic of color" is improved.

While the color filter 61 for four colors is constituted in the above example by arrangement such that B filters are provided at the left and right sides of G1 filter, and R filters are provided at left and right sides of the G2 filter as shown in FIG. 6, such color filter may be constituted by arrangement as shown in FIG. 19. In the color filter 61 for four colors shown in FIG. 19, R filters are provided at left and right sides of the G1 filter, and B filters are provided at left and right sides of the G2 filter. Also by constituting the color filter 61 for four colors in this way, it becomes possible to improve "discriminating characteristic of color", "reproduction characteristic of color" and "reduction characteristic of noise" similarly to the color filter shown in FIG. 6.

Figure 4:
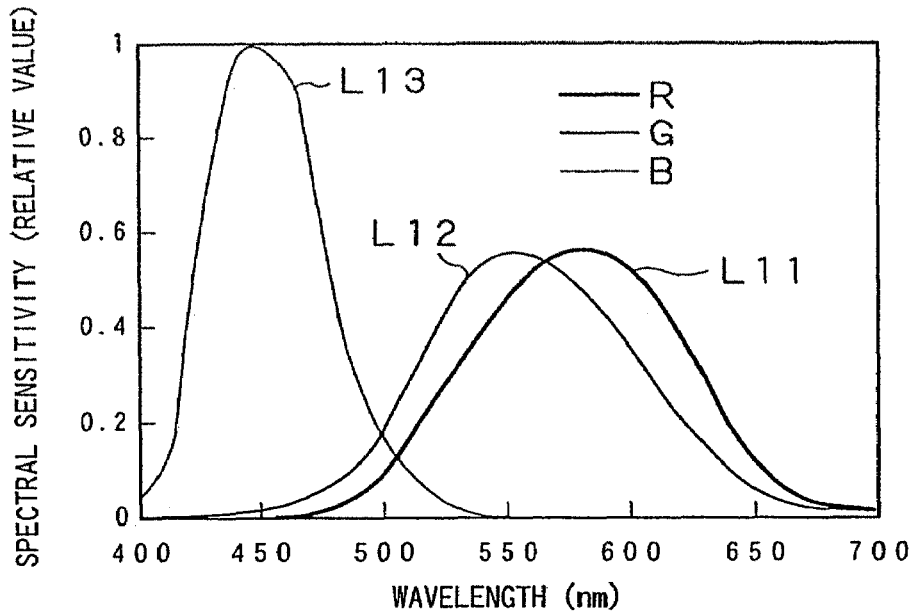
FIG. 4 is a view showing another example of spectral sensitivity characteristic.

Meanwhile, in the case where linear matrix coefficients M are determined in such a manner to minimize color difference (ΔE value), if spectral sensitivities of color filters formed at the front stage portion of the image sensor 45 overlap with each other as shown in FIG. 4, differences between linear matrix coefficients M become large as indicated by the formula (21), $$\begin{bmatrix} r'(\lambda) \\ g'(\lambda) \\ b'(\lambda) \end{bmatrix} = \begin{bmatrix} 6.56 & -5.54 & 1.18 \\ -2.01 & 3.12 & -0.16 \\ 0.12 & -0.28 & 1.07 \end{bmatrix} \cdot \begin{bmatrix} r(\lambda) \\ g(\lambda) \\ b(\lambda) \end{bmatrix} \quad (21)$$

Since very small noise component is included in an output signal of the image pick-up device, when such linear matrix coefficients M are used to perform color separation processing, very small noise component is also amplified. Accordingly, there takes place the necessity in which noise reduction characteristic is taken into consideration rather than color reproduction characteristic so that differences between linear matrix coefficients M do not large. However, there are instances where when image of object is actually picked up by such image pick-up apparatus, there is employed a method in which linear matrix coefficients M are determined under the condition where importance is attached to noise reduction characteristic rather than color reproduction characteristic by scene and/or environment to be imaged to adaptively perform linear matrix processing so that improvement in picture quality can be realized. Conversely, there are instances where there is employed a method in which importance is attached to color reproduction characteristic rather than noise reduction characteristic to determine linear matrix coefficients M to adaptively perform linear matrix processing so that improvement in picture quality can be realized. In addition, since use purpose of the image pick-up apparatus is different every user, there are instances where user desires to arbitrarily perform determination of linear matrix coefficients M.

Figure 20:
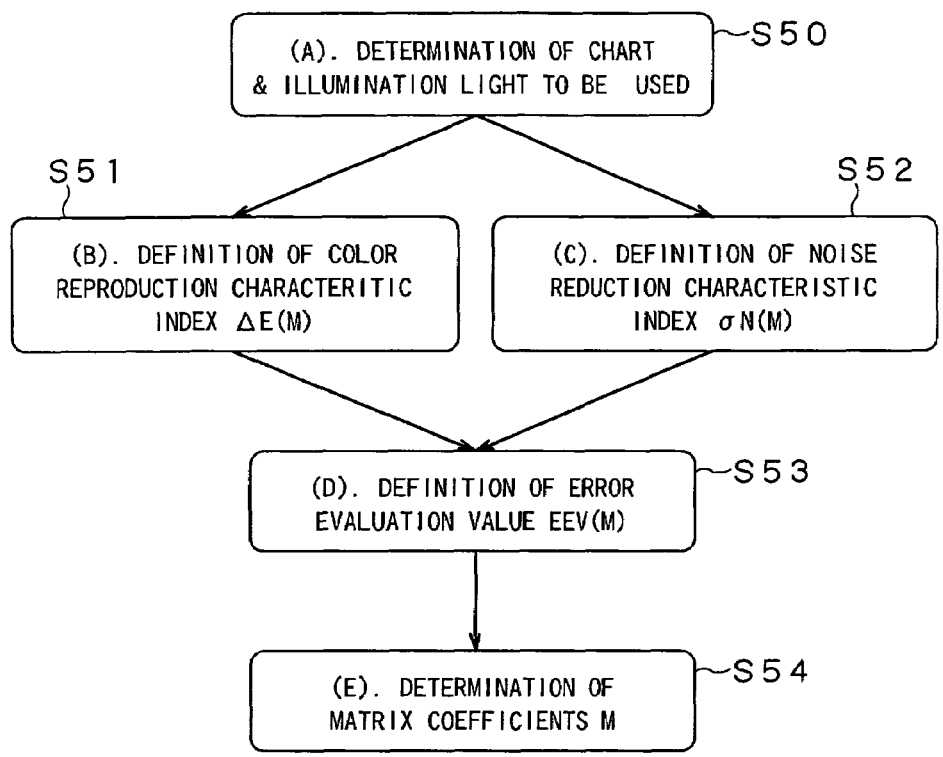
FIG. 20 is a flowchart showing that linear matrix coefficients M are adaptively determined.

In view of the above, in the image pick-up apparatus according to the invention of this Application, in order to solve problems as described above, linear matrix coefficients M are determined in accordance with the flowchart shown in FIG. 20.

First, determination of chart and illumination light which are used is performed (step S50). Then, definition of color reproduction characteristic index ΔE(M) is performed (step S51). Then, definition of noise reduction index σN(M) is performed (step S52). Then, definition of EEV(M) (Error Evaluation Value) is performed (step S53). Further, linear matrix coefficients M are determined on the basis of the EEV (M) (step S54). It is to be noted that, at the step S54, coefficients of EEV(M) are adaptively changed depending upon image pick-up condition, etc. to determine corresponding linear matrix coefficients M. The detail of respective steps will be explained below.

Determination of chart and illumination light which are used (step S50) will be explained. In order to determine linear matrix coefficients M, it is necessary to determine color chart and light source for illuminating the color chart. As color chart, there are conceivable various reflection charts or transmission charts consisting of color patches having plural uniform color planes such as Macbeth Color Checker, Digital Camera Color Checker, IT8.7, etc. As illumination light, there is conceivable illumination light (e.g., D55 light source, etc.) having spectral sensitivity close to light of the environment where the image pick-up apparatus is frequently used. It is to be noted that since it is conceivable that the mage pick-up apparatus is used under various light sources depending upon use purpose of user, illumination light is not limited to only light of the environment where the image pick-up apparatus is frequently used as illumination light.

Then, definition of color reproduction characteristic index ΔE(M) (step S51) will be explained. The color reproduction characteristic is defined by difference between target color and color (hereinafter referred to as output color) that signal value in which linear matrix processing is performed at linear matrix processing unit 95 of the image pick-up apparatus indicates. It is to be noted that while RGB values, YCbCr values or XYZ values, etc. are variously conceivable as value of color, a method of performing definition processing by using values (L*a*b*value, L*u*v*value, etc.) of color space where sensory perception is uniform with respect to seeing of the eye of the human being makes it possible to more precisely indicate difference of color. For example, when target color of the k-th color patch in the color chart is assumed to be $Lab_{ref\_k}(L^*_{ref\_k}, a^*_{ref\_k}, b^*_{ref\_k})$, and output color of the image pick-up apparatus is assumed to be $L^*a^*b^*_{shot\_k}$ ($L^*_{shot\_k}$, $a^*_{shot\_k}$, $b^*_{shot\_k}$), color difference $\Delta E_k$ of this patch is represented by the formula (22).

$$\Delta E_k = \sqrt{(L^*_{ref\_k} - L^*_{shot\_k})^2 + (a^*_{ref\_k} - a^*_{shot\_k})^2 + (b^*_{ref\_k} - b^*_{shot\_k})^2} \quad (22)$$

Moreover, as color reproduction characteristic index ΔE(M), there are conceivable average ΔE value of respective patches of the color chart, and/or value in which weighting is performed with respect to respective patches so that importance is attached to color reproduction characteristic of a specific color, etc.

$$\Delta E = \frac{1}{TotalPatchNum} \int_{k=1}^{TotalPatchNum} w_k \cdot \Delta E_k \qquad (23)$$

In the above formula, $w_k$ indicates weighting coefficients with respect to respective patches, and TotalPatchNum indicates the total number of color patches.

Moreover, since linear matrix processing is implemented to output color of the image pick-up apparatus in practice, $L^*a^*b^*_{shot\_k}$ indicates function value of linear matrix coefficients M. Accordingly, $\Delta E_k$ and $\Delta E$ both result in function value of M.

$$\Delta E(M) = \frac{1}{TotalPatchNum} \int_{k=1}^{TotalPatchNum} w_k \cdot \Delta E_k(M)$$

$$= \frac{1}{TotalPatchNum} \int_{k=1}^{TotalPatchNum} w_k \cdot \sqrt{(L^*_{ref\_k} - L^*_{shot\_k}(M))^2 + (a^*_{ref\_k} - a^*_{shot\_k}(M))^2 + (b^*_{ref\_k} - b^*_{shot\_k}(M))^2} \qquad (24)$$

Then, definition of noise reduction characteristic index σN(M) (step S52) will be explained. The noise reduction characteristic index σN(M) is defined by standard deviation of signal values in which linear matrix processing is performed at linear matrix processing unit 95 of the image pick-up apparatus. As signal value, there are conceivable RGB values, YCbCr values or XYZ values, etc. In this case, a method of defining signal value by using values of color space where sensory perception is uniform with respect to seeing of the eye of the human being (L*a*b*value, L*u*v*value), etc. makes it possible to obtain noise value $\sigma N_k$ having higher correlation with respect to noise feeling that the human being feels. At this time, noise value results in standard deviation of respective components of color space in correspondence with color space of signal value. For example, in the case of RGB space, noise value results in σR, σG, σB. In the case of XYZ space, noise value results in σX, σY, σZ. In the definition of the noise reduction characteristic index σN(M), these noise values are used to determine single noise index. For example, in the case where image of a certain color patch is picked up under illumination light, noise value $\sigma N_k$ of L*a*b* space is defined from values of lightness noise $\sigma L^*_k$ and color noises $\sigma a^*_k$, $\sigma b^*_k$ on the premise that lightness and color noise are taken into consideration, as indicated by, e.g., the formula (25).

$$\sigma N_k = \sqrt{\left(\frac{\sigma L^*_k}{wL^*_k}\right)^2 + \left(\frac{\sigma a^*_k}{wa^*_k}\right)^2 + \left(\frac{\sigma b^*_k}{wb^*_k}\right)^2} \qquad (25)$$

In this case, $wL^*_k$, $wa^*_k$, $wb^*_k$ indicate weighting coefficients with respect to respective standard deviation values, and are suitably set by the correlation with respect to noise feeling that the eye of the human being feels. It is to be noted that noise value using variance value of other color space, etc. may be variously conceivable as noise value $\sigma N_k$. As noise reduction characteristic index σN(M), there are conceivable average σN value of respective patches of color chart, and/or value in which weighting is performed with respect to respective patches so that importance is attached to noise reduction characteristic of a specific color, etc.

$$\sigma N = \frac{1}{TotalPatchNum} \int_{k=1}^{TotalPatchNum} w_k \cdot \sigma N_k \qquad (26)$$

In practice, since linear matrix processing is implemented to signal value of the image pick-up apparatus, $\sigma N_k$ and σN result in function values of the linear matrix coefficients M.

$$\sigma N(M) = \frac{1}{TotalPatchNum} \int_{k=1}^{TotalPatchNum} w_k \cdot \sigma N_k(M) \qquad (27)$$

Then, definition of EEV (M) (step S53) will be explained. By the definition of the above-described steps S51 and S52, EEV (Error Evaluation Value) (M) in which two values of color reproduction characteristic index ΔE(M) and noise reduction characteristic index σN(M) which are function values of the linear matrix coefficients M are taken into consideration is defined in a manner as indicated by the formula (28).

$$EEV(M)=l[j\{wc \cdot h(\Delta E(M))\}+k\{wn \cdot i(\sigma N(M))\}] \qquad (28)$$

In the above formula, h, I, j, k, l indicate function, wc indicates weighting coefficient with respect to color difference, and wn indicates weighting coefficient with respect to noise value. By changing wc and wn to determine linear matrix coefficients M so that EEV (M) becomes minimum, determination of linear matrix coefficients M in which both color reproduction characteristic and noise reproduction characteristic are taken into consideration can be made. It is to be noted that it is sufficient that in the case where importance is attached to color reproduction characteristic, weighting is set so that wc>wn, and in the case where importance is attached to noise reduction characteristic, weighting is set so that wc<wn.

Then, means for determining linear matrix coefficients M (step S54) will be explained. The error least square method is applied to the EEV (M) defined by the step S53 to determine linear matrix coefficients M. In this case, at step S54, wc and wn are suitably determined to use, e.g., Newton method, Steepest Descent method or Conjugate Gradient method, etc. as recursive algorithm and to apply error least square method, and thus to determine linear matrix coefficients M.

Figure 21:
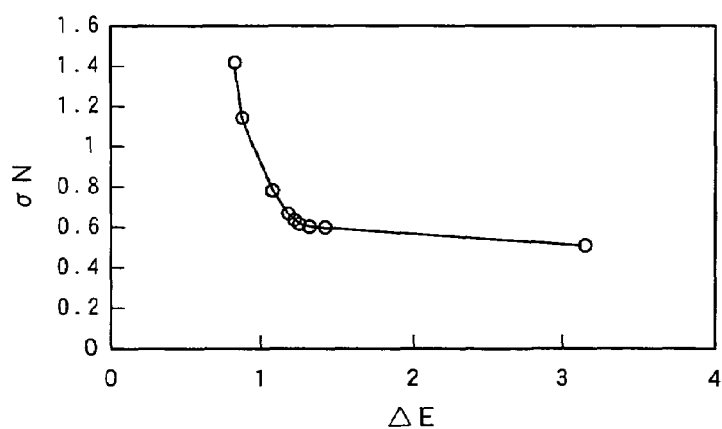
FIG. 21 is a view showing the state of change of noise reduction characteristic index when color reproduction characteristic index is changed.

Moreover, at step S54, weighting coefficient wc with respect to color difference and weighting coefficient wn with respect to noise value of EEV (M) defined at the step S53 are adaptively changed by environment and/or condition, etc. when image of object is picked up by the image pick-up apparatus to determine linear matrix coefficients M by the error least square method. The state of change of noise value reduction characteristic index σN(M) when color reproduction characteristic index ΔE(M) is changed is shown in FIG. 21. As shown in FIG. 21, also in one image pick-up apparatus, trade-off of color reproduction characteristic index ΔE(M) and noise reduction characteristic index σN(M) exists by linear matrix coefficients M. By using this result, linear matrix coefficients M are adaptively determined in accordance with various image pick-up environments and conditions, etc. Moreover, several sets of linear matrix coefficients M may be prepared in advance to allow user to select linear matrix coefficients M as occasion demands to adjust color reproduction characteristic index ΔE(M) and noise reduction characteristic index σN(M).

Figure 22:
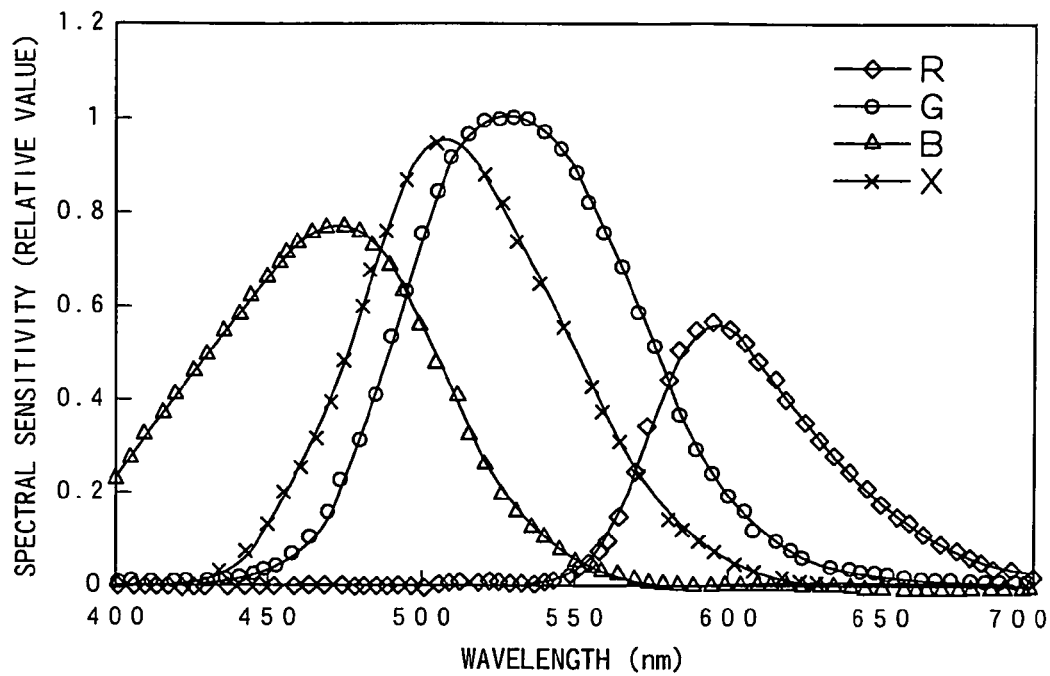
FIG. 22 is a view showing an example of spectral sensitivity characteristic of color filter for four colors.

Here, a practical example in which in the case where the image pick-up apparatus includes CCD image pick-up device comprised of color filters for four colors having the characteristic as shown in FIG. 22, linear matrix coefficients M are determined in accordance with the above-described steps S50 to S54 will be described.

First, chart and illumination light which are used are determined (step S50). As color chart, Macbeth Color Checker (including color patches of 24 colors) is used. As illumination light, D55 light source (standard day light of 5500 k defined by CIE) is used. It is to be noted that it is assumed that respective spectral data are measured by using, e.g., spectral radiation luminance meter.

Then, definition of color reproduction characteristic index ΔE(M) is performed (step S51). Target color is caused to correspond to seeing of the eye of the human being, and color difference ΔE in Lab space is caused to be index. In general, object color is defined, as indicated by the formula (29), by value obtained by integrating product of "spectral reflection factor of object", "spectral energy distribution of illumination" and "spectral sensitivity distribution of sensor for sensing object" within the range of visible light region vis (ordinarily 400 nm to 700 nm).

$$\text{Objectcolor} = \int_{vis}(\text{spectralreflectionfactor of object}) \cdot (\text{spectralluminance of illumination}) \cdot (\text{spectralsensitivity of sensor for sensingobject}) \quad (29)$$

Further, when color matching function representing spectral sensitivity of the eye of the human being is used, target colors $XYZ_{ref\_k}(X_{ref\_k}, Y_{ref\_k}, Z_{ref\_k})$ of the k-th patch of the color chart can be represented by the formula (30) by using the formula (29).

$$\left.\begin{aligned} X_{ref\_k} &= m \int_{vis} R_k(\lambda) \cdot L(\lambda) \cdot \bar{x}(\lambda) d\lambda \\ Y_{ref\_k} &= m \int_{vis} R_k(\lambda) \cdot L(\lambda) \cdot \bar{y}(\lambda) d\lambda \\ Z_{ref\_k} &= m \int_{vis} R_k(\lambda) \cdot L(\lambda) \cdot \bar{z}(\lambda) d\lambda \end{aligned}\right\} \quad (30)$$

In the above formula, $R_k(\lambda)$: Spectralreflectionfactor of the k-th color patch within Macbethchart $L(\lambda)$: Illumination light D55 spectralradiationluminance $\bar{x}, \bar{y}, \bar{z}$: color matching function $m = 1/\int_{vis} L(\lambda) \cdot \bar{y}(\lambda) d\lambda$ Moreover, ordinarily, colors of the XYZ space are transformed into colors of L*a*b* space by using the formula (31).

$$\left.\begin{aligned} L^* &= 116 \cdot (Y/Y_n)^{1/3} - 16 \\ a^* &= 500 \cdot \{(X/X_n)^{1/3} - (Y/Y_n)^{1/3}\} \\ b^* &= 200 \cdot \{(Y/Y_n)^{1/3} - (Z/Z_n)^{1/3}\} \end{aligned}\right\} \quad (31)$$

In the above formula, $(X_n, Y_n, Z_n)$ indicates XYZ values of complete diffused reflection surface (white point).

Further, target color $XYZ_{ref\_k}$ is transformed into $L^*a^*b^*_{ref\_k}(L^*_{ref\_k}, a^*_{ref\_k}, b^*_{ref\_k})$ by using the formula (31).

In addition, raw data $RGBX_{raw\_k}(R_{raw\_k}, G_{raw\_k}, B_{raw\_k}, X_{raw\_k})$ which are signal values outputted from the CCD image pick-up device are represented by the formula (32) by using the formula (29).

$$\left.\begin{aligned} R_{raw\_k} &= mr \int_{vis} R_k(\lambda) \cdot L(\lambda) \cdot \bar{r}(\lambda) d\lambda \\ G_{raw\_k} &= mg \int_{vis} R_k(\lambda) \cdot L(\lambda) \cdot \bar{g}(\lambda) d\lambda \\ B_{raw\_k} &= mb \int_{vis} R_k(\lambda) \cdot L(\lambda) \cdot \bar{b}(\lambda) d\lambda \\ X_{raw\_k} &= mx \int_{vis} R_k(\lambda) \cdot L(\lambda) \cdot \bar{x}(\lambda) d\lambda \end{aligned}\right\} \quad (32)$$

In the above formula, r,g,b,x: spectralsensitivity distribution of CCD color filter of camera $mr = 1/\int_{vis} L(\lambda) \cdot \bar{r}(\lambda) d\lambda$ $mg = 1/\int_{vis} L(\lambda) \cdot \bar{g}(\lambda) d\lambda$ $mb = 1/\int_{vis} L(\lambda) \cdot \bar{b}(\lambda) d\lambda$ $mx = 1/\int_{vis} L(\lambda) \cdot \bar{x}(\lambda) d\lambda$ Since the image pick-up apparatus performs linear matrix processing of raw data $RGBX_{raw\_k}(R_{raw\_k}, G_{raw\_k}, B_{raw\_k}, X_{raw\_k})$ by using linear matrix coefficients M (m0 to m11) at the linar matrix processing unit 95, image pick-up data after undergone linear matrix processing is represented by the formula (33).

$$\begin{bmatrix} R_{cam\_k} \\ G_{cam\_k} \\ B_{cam\_k} \end{bmatrix} = M \cdot \begin{bmatrix} R_{raw\_k} \\ G_{raw\_k} \\ B_{raw\_k} \\ X_{raw\_k} \end{bmatrix} \quad (33)$$

$$= \begin{bmatrix} m0 & m1 & m2 & m3 \\ m4 & m5 & m6 & m7 \\ m8 & m9 & m10 & m11 \end{bmatrix} \cdot \begin{bmatrix} R_{raw\_k} \\ G_{raw\_k} \\ B_{raw\_k} \\ X_{raw\_k} \end{bmatrix}$$

Further, the $RGB_{cam\_k}$ is transformed into XYZ value. It is to be noted that 709 system matrix $M_{709}$ generally used is used as shown in the formula (34) for the transform processing.

$$\begin{bmatrix} X \\ Y \\ Z \end{bmatrix} = M_{709} \cdot \begin{bmatrix} R \\ G \\ B \end{bmatrix} \quad (34)$$

$$= \begin{bmatrix} 0.4124 & 0.3576 & 0.1805 \\ -0.9689 & 1.8758 & 0.0415 \\ 0.0557 & -0.204 & 1.057 \end{bmatrix} \cdot \begin{bmatrix} R \\ G \\ B \end{bmatrix}$$

Then, $X_{cam\_k}$, $Y_{camk}$ and $Z_{cam\_k}$ are determined by using the formula (34).

$$\begin{bmatrix} X_{cam\_k} \\ Y_{cam\_k} \\ Z_{cam\_k} \end{bmatrix} = \begin{bmatrix} 0.4124 & 0.3576 & 0.1805 \\ -0.9689 & 1.8758 & 0.0415 \\ 0.0557 & -0.204 & 1.057 \end{bmatrix} \cdot \begin{bmatrix} R_{cam\_k} \\ G_{cam\_k} \\ B_{cam\_k} \end{bmatrix} \quad (35)$$

Moreover, transform processing into L*a*b* value (L*a*b*$_{cam\_k}$(L*$_{cam\_k}$, a*$_{cam\_k}$, b*$_{cam\_k}$) is performed by using the formula (31) to define color difference $\Delta E_k$ of the k-th patch of the color chart by the formula (36).

$$\Delta E_k = \sqrt{(L^*_{ref\_k} - L^*_{cam\_k})^2 + (a^*_{ref\_k} - a^*_{cam\_k})^2 + (b^*_{ref\_k} - b^*_{cam\_k})^2} \quad (36)$$

It is to be noted that since value of L*a*b*$_{cam\_k}$ is used, $\Delta E_k$ can be represented as $\Delta E_k(M)$ because it is also function value of the linear matrix coefficients M. The color reproduction characteristic index $\Delta E(M)$ is defined as average value of color differences of respective color patches as shown in the formula (37).

$$\Delta E(M) = \frac{1}{TotalPatchNum} \int_{k=1}^{TotalPatchNum} \Delta E_k(M) \quad (37)$$

In the formula, TotalPatchNum=24: Total number of color patches

Then, definition of noise reduction characteristic index $\sigma N(M)$ is performed (step S52). Here, noise reduction characteristic index $\sigma N(M)$ is defined on the basis of $\sigma L(M)$ component included in signal value after undergone linear matrix processing by the linear matrix processing unit 95 of the image pick-up apparatus.

In general, noise Noise$_{\_raw}$ included in signal $CV_{\_CCD}$ that the CCD image pick-up device itself outputs is defined by the formula (38).

$$Noise_{raw} = \sqrt{ShotNoiseCoef \cdot CV_{CCD} + DarkNoise} \quad (38)$$
$$= \sqrt{ShotNoise + DarkNoise}$$

It is to be noted that ShotNoiseCoef and DarkNoise are values determined by the device characteristic of the CCD image pick-up device. DarkNoise represents noise component which is not dependent upon signal value (Fixed Pattern Noise, etc.), and ShotNoise represents noise component dependent upon signal value (Sensor Dark Noise, Photon Shot Noise, etc.).

When the formula (31) is used, noise components included in raw data of the k-th color patch of the image pick-up apparatus to be evaluated are defined by the formula (39).

$$\begin{aligned} Noise_{Rraw\_k} &= \sqrt{ShotNoiseCoef \cdot R_{raw\_k} + DarkNoise} \\ Noise_{Graw\_k} &= \sqrt{ShotNoiseCoef \cdot G_{raw\_k} + DarkNoise} \\ Noise_{Braw\_k} &= \sqrt{ShotNoiseCoef \cdot B_{raw\_k} + DarkNoise} \\ Noise_{Xraw\_k} &= \sqrt{ShotNoiseCoef \cdot X_{raw\_k} + DarkNoise} \end{aligned} \quad (39)$$

Moreover, in the literature (P. D. Burns and R. S. Berns, "Error Propagation Analysis in Color Measurament and Imaging", Color Research and Application, 1997), noise propagation theory as explained below is described.

When a predetermined input signal X'=[$x_1, x_2, \ldots, x_n$] is assumed to be linearly transformed into Y'=[$y_1, y_2, \ldots, y_m$] by (m×n) matrix A, linearly transformed signal is represented by the formula (40).

$$Y' = A \cdot X' \quad (40)$$

When variance-covariance matrix $\Sigma_x$ of input signal X' is assumed to be represented by the formula (41), diagonal component results in Noise variance value of input signal.

$$\Sigma_x = \begin{bmatrix} \sigma_{11} & \sigma_{12} & \cdots & \sigma_{1n} \\ \sigma_{21} & \sigma_{22} & & \\ \vdots & & \ddots & \\ \sigma_{n1} & & & \sigma_{nn} \end{bmatrix} \quad (41)$$

If there is no correlation between input signal values mutually, covariance component (i.e., non-diagonal component) in the matrix component becomes equal to zero. At this time, variance-covariance matrix $\Sigma_y$ of output signal Y is defined by the formula (42).

$$\Sigma_y = A \cdot \Sigma_x \cdot A' \quad (42)$$

It is to be noted that the formula (42) results in propagation theoretic formula of Noise variance value between color spaces which can be transformed by linear transform.

Moreover, in order to transform signal RGB$_{cam\_k}$ after undergone linear matrix processing by the linear matrix processing unit 95 of the image pick-up apparatus into L*a*b*$_{cam\_k}$, it is necessary to perform transform processing from RGB space to XYZ space (hereinafter referred to as RGB→XYZ transform processing) thereafter to perform transform processing from XYZ space to L*a*b*space (hereinafter referred to as XYZ→L*a*b* transform processing). In the RGB→XYZ transform processing, it is possible to perform linear transform by using 709 system $M_{709}$ shown in the formula (34), whereas in the XYZ→L*a*b* transform processing, it is necessary to perform non-linear transform in a manner as shown in the formula (31). However, in the XYZ→L*a*b* transform processing, linear approximation can be made by using Jacobian matrix $J_{L^*a^*b^*\_k}$ because noise quantity is very small. Thus, XYZ→L*a*b* transform processing can be performed by linear transform in a manner similar to RGB→XYZ transform processing.

When value obtained by transforming signal value after linear matrix into XYZ value is expressed as $XYZ_{cam\_k}$ ($X_{cam\_k}, Y_{cam\_k}, Z_{cam\_k}$), this value can be represented by the formula (43).

$$J_{L^*a^*b^*\_k} = J_0 D(XYZ_{cam\_k}) \tag{43}$$

In the above formula, $J_0$ is expressed as the formula (44).

$$J_0 = \begin{bmatrix} 0 & 116 & 0 \\ 500 & -500 & 0 \\ 0 & 200 & -200 \end{bmatrix} \tag{44}$$

Moreover, when $v(a, b)$ is expressed as below, $$v(a, b) = \begin{cases} \frac{1}{3} \cdot a^{-\frac{2}{3}} \cdot b^{-\frac{1}{3}} & \frac{a}{b} > 0.008856 \\ 7.787 \cdot b^{-1} & \frac{a}{b} \le 0.008856 \end{cases}$$

the formula (45) is provided.

$$D(XYZ_{cam\_k}) = \begin{bmatrix} v(X_{cam\_k}, X_n) & 0 & 0 \\ 0 & v(Y_{cam\_k}, Y_n) & 0 \\ 0 & 0 & v(Z_{cam\_k}, Z_n) \end{bmatrix} \tag{45}$$

In the above formula, XYZ value of complete diffused reflection surface (white point) is set to $XYZn$ ($Xn, Yn, Zn$).

Accordingly, approximate matrix $M_{total\_k}$ for linearly transforming raw data outputted from the CCD image pick-up device into Lab value is expressed as the formula (46).

$$M_{total\_k} = J_{L^*a^*b^*\_k} \cdot M_{709} \cdot M \tag{46}$$

When the matrix of the formula (46) and the formula of noise propagation theory shown in formula (42) are applied, lightness noise $\sigma L_k$ at the k-th color patch can be calculated by the formula (47).

Accordingly, it is possible to derive the formula (48) from the formula (47).

$$\sigma L^*_k = \sqrt{\sigma^2 L^*_k} \tag{48}$$

It is to be noted that since the formula (48) is function of linear matrix coefficients M, this formula can be represented by $\sigma L^*_k(M)$. Since noise reduction characteristic index $\sigma N(M)$ is average value of respective lightness noises of color patch, $\sigma N(M)$ can be defined by the formula (49).

$$\sigma N(M) = (1/24) \cdot \int_{k=1}^{24} \sigma L^*_k(M) \tag{49}$$

Then, EEV(M) in which color reproduction characteristic index $\Delta E(M)$ and noise reduction characteristic index $\sigma N(M)$ which are defined as described above are taken into consideration is defined by the formula (50) (step S53).

$$EEV(M) = \sqrt{(wc \cdot \Delta E(M))^2 + (wn \cdot \sigma N(M))^2} \tag{50}$$

In the above formula,
wc: weighting coefficient with respect to color reproduction characteristic
wn: weighting coefficient with respect to noise reduction characteristic.

Then, the formula (50) is solved by the error least square method to determine linear matrix coefficients M. When, e.g., wc is set to 1, and wn is set to 2, EEV(M) is represented by the formula (51).

$$EEV(M) = \sqrt{\Delta E(M)^2 + (2 \cdot \sigma N(M))^2} \tag{51}$$

The formula (51) is solved by the error least square method to determine linear matrix coefficients M by the formula (52) (step S54).

$$M = \begin{bmatrix} 1.57 & -0.43 & -0.01 & -0.12 \\ -0.14 & 1.25 & -0.37 & 0.26 \\ -0.01 & -0.27 & 1.68 & -0.40 \end{bmatrix} \tag{52}$$

On the other hand, color difference matrix in which wc is set to 1 and wn is set to 0, i.e., importance is attached (attention is paid) to only color reproduction characteristic is represented by the formula (53)

$$\sum_{L^*a^*b^*\_k} = M_{total\_k} \cdot \sum_{RGBraw\_k} \cdot M'_{total\_k} \tag{47}$$

$$\begin{bmatrix} \sigma^2 L^*_k & \sigma L^* a^*_k & \sigma L^* b^*_k \\ \sigma a^* L^*_k & \sigma^2 a^*_k & \sigma a^* b^*_k \\ \sigma b^* L^*_k & \sigma b^* a^*_k & \sigma^2 b^*_k \end{bmatrix} = M_{total\_k} \cdot \begin{bmatrix} NoiseRawR\_k & 0 & 0 & 0 \\ 0 & NoiseRawG\_k & 0 & 0 \\ 0 & 0 & NoiseRawB\_k & 0 \\ 0 & 0 & 0 & NoiseRawX\_k \end{bmatrix} \cdot M'_{total\_k}$$

$$M = \begin{bmatrix} 1.48 & 0.56 & 0.35 & -1.39 \\ -0.22 & 2.19 & -0.01 & -0.96 \\ -0.06 & 0.27 & 1.93 & -1.14 \end{bmatrix} \quad (53)$$

When comparison between the formula (52) and the formula (53) is performed, it can be confirmed that difference between coefficients of the formula (53) is clearly larger, and the formula (53) is matrix to increase noise.

Here, a practical example for adaptively determining linear matrix coefficients M on the basis of setting of ISO sensitivity of the image pick-up apparatus will be described. The image pick-up apparatus serves to amplify or attenuate signal inputted from the CCD image pick-up device (hereinafter referred to as input signal) on the basis of setting of the ISO sensitivity. When setting of the ISO sensitivity of the image pick-up apparatus is changed from ISO100 to ISO200, an input signal is amplified so that its value becomes equal to, e.g., value which is twice greater than at the time of ISO100. The input signal thus amplified is inputted to the image pick-up apparatus. However, in the image pick-up apparatus, since linear matrix processing is performed by using the same linear matrix coefficients M with respect to all input signals in spite of setting state of the ISO sensitivity, in the case where setting of the ISO sensitivity is high, noise component included in an input signal is together amplified followed by amplification of the input signal. Accordingly, even when attempt is made to raise setting of the ISO sensitivity to obtain image of high resolution, an image in which amplified noise component is included would be generated.

In view of the above, in the image pick-up apparatus according to the present invention of this Application, linear matrix coefficients M are determined by taking into consideration reduction characteristic of noise component included in an input signal amplified or attenuated on the basis of setting of ISO sensitivity to perform linear matrix processing by using the linear matrix coefficients M. For example, as shown in the Table 1, weighting coefficient (wn) with respect to noise reduction characteristic is permitted to be changed in accordance with setting of ISO sensitivity to substitute wc and wn into the formula (50) and to determine linear matrix coefficients M every setting of the ISO sensitivity. Accordingly, since the image pick-up apparatus can perform linear matrix processing by using linear matrix coefficients M determined on the basis of setting state of the ISO sensitivity, even if setting of the ISO sensitivity is caused to be high, there is no possibility that noise component is amplified followed by this, thus to have ability to obtain image of high resolution.

TABLE 1

| SETTING OF ISO SENSITIVITY | wc | wn |
| --- | --- | --- |
| 100 | 1 | 1 |
| 200 | 1 | 2 |
| 400 | 1 | 4 |
| 800 | 1 | 6 |

Here, an example for adaptively determining linear matrix coefficients M on the basis of the environment where image of object is picked up by the image pick-up apparatus will be described. For example, in the case where image of object, e.g., night view, etc. is picked by the image pick-up apparatus, there are instances where the dark portion may occupy the large part of generated image. When noise takes place at that dark portion, such noise becomes very conspicuous. In such a case, it is better to take into consideration noise reduction characteristic of noise component rather than color reproduction characteristic.

Figure 23:
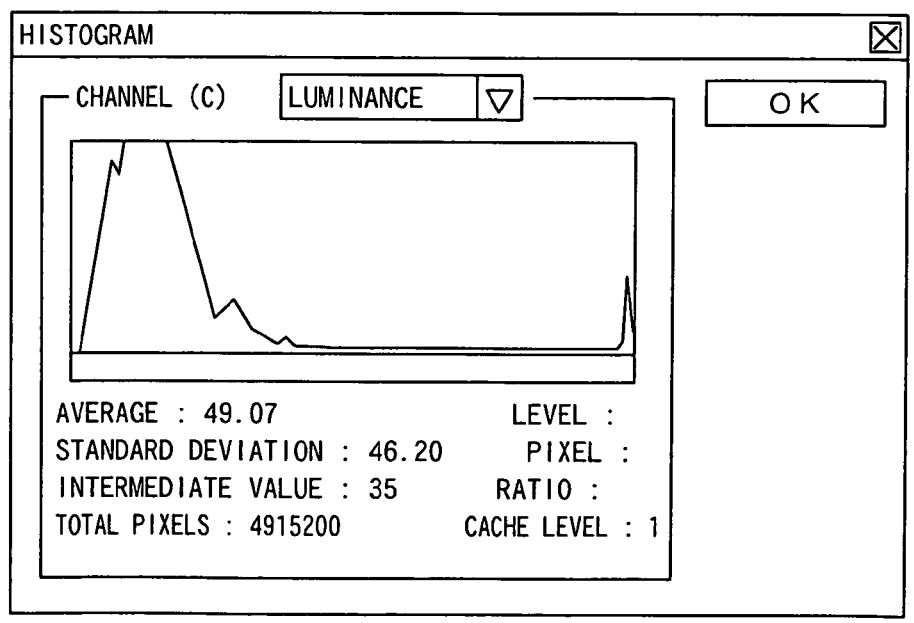
FIG. 23 is a view showing histogram of image.

In view of the above, in the image pick-up apparatus according to the present invention, linear matrix coefficients M are determined by taking noise reduction characteristic and color reproduction characteristic into consideration on the basis of scene in which image of object is picked up to perform near matrix processing by using the linear matrix coefficients M. For example, as shown in the histogram of FIG. 23, when 70% of luminance component of generated image or more is included within one half or less of the luminance dynamic range of the image pick-up apparatus, importance is attached to noise reduction characteristic to determine linear matrix coefficients M. When except for the above, color reproduction characteristic and noise reduction characteristic are taken into consideration to determine linear matrix coefficients M. In concrete terms, as shown in the Table 2, weighting coefficient (wn) with respect to noise reduction characteristic is permitted to be changed in accordance with image pick-up scene to substitute wc and wn into the formula (50) to determine linear matrix coefficients M every image pick-up scene. Accordingly, since the image pick-up apparatus can perform linear matrix processing by using linear matrix coefficients M determined on the basis of image pick-up scene, even if dark portion occupies the large part of generated image, it becomes possible to prevent noise component from becoming conspicuous.

TABLE 2

| IMAGE PICK-UP SCENE | wc | wn |
| --- | --- | --- |
| NIGHT VIEW | 1 | 8 |
| OTHERS | 1 | 2 |

Here, practical example for adaptively determining linear matrix coefficients M on the basis of request of user who uses the image pick-up apparatus will be described. There are many instances where image generated by picking up image of object by the image pick-up apparatus is required that noise is caused to be lesser as compared to color reproduction characteristic according to use purpose of user. The use purpose is the matter that manufacturing companies (makers) of the image pick-up apparatus do not know, but is the fact that only users know.

In view of the above, the image pick-up apparatus according to the present invention of this Application serves to determine linear matrix coefficients M on the basis of the condition that user intends, and to perform linear matrix processing by using the linear matrix coefficients M. For example, as shown in the Table 3, weighting coefficient (wn) with respect to noise reduction characteristic is permitted to be changed in accordance with noise quantity adjustment variable to substitute wn and wc into the formula (50), to determine linear matrix coefficients M every noise quantity adjustment variable, and to store the linear matrix coefficient M thus determined, whereby when user changes noise quantity adjustment variable through the interface of the image pick-up apparatus, predetermined linear matrix coefficients M are determined to perform linear matrix processing by using the linear matrix coefficients M. Accordingly, since the image pick-up apparatus can perform linear matrix processing by using the determined linear matrix coefficients M in accordance with request of user, it is possible to perform noise quantity adjustment corresponding to user situation of user

TABLE 3

| NOISE QUANTITY ADJUSTMENT VARIABLE | wc | wn |
|---|---|---|
| 0 | 1 | 1 |
| 1 | 1 | 2 |
| 2 | 1 | 3 |
| 3 | 1 | 4 |
| 4 | 1 | 5 |
| 5 | 1 | 6 |

It is to be noted that the Table 3 means that the larger becomes numeric value of the noise quantity adjustment variable, the more noise quantity is reduced. Moreover, in place of performing setting of noise quantity adjustment variable before image pick-up operation, there may be employed an approach in which when image pick-up start button of the image pick-up apparatus is pushed down, image after undergone linear matrix processing using several linear matrix coefficients M are preserved (stored) into plural memories.

Figure 12:
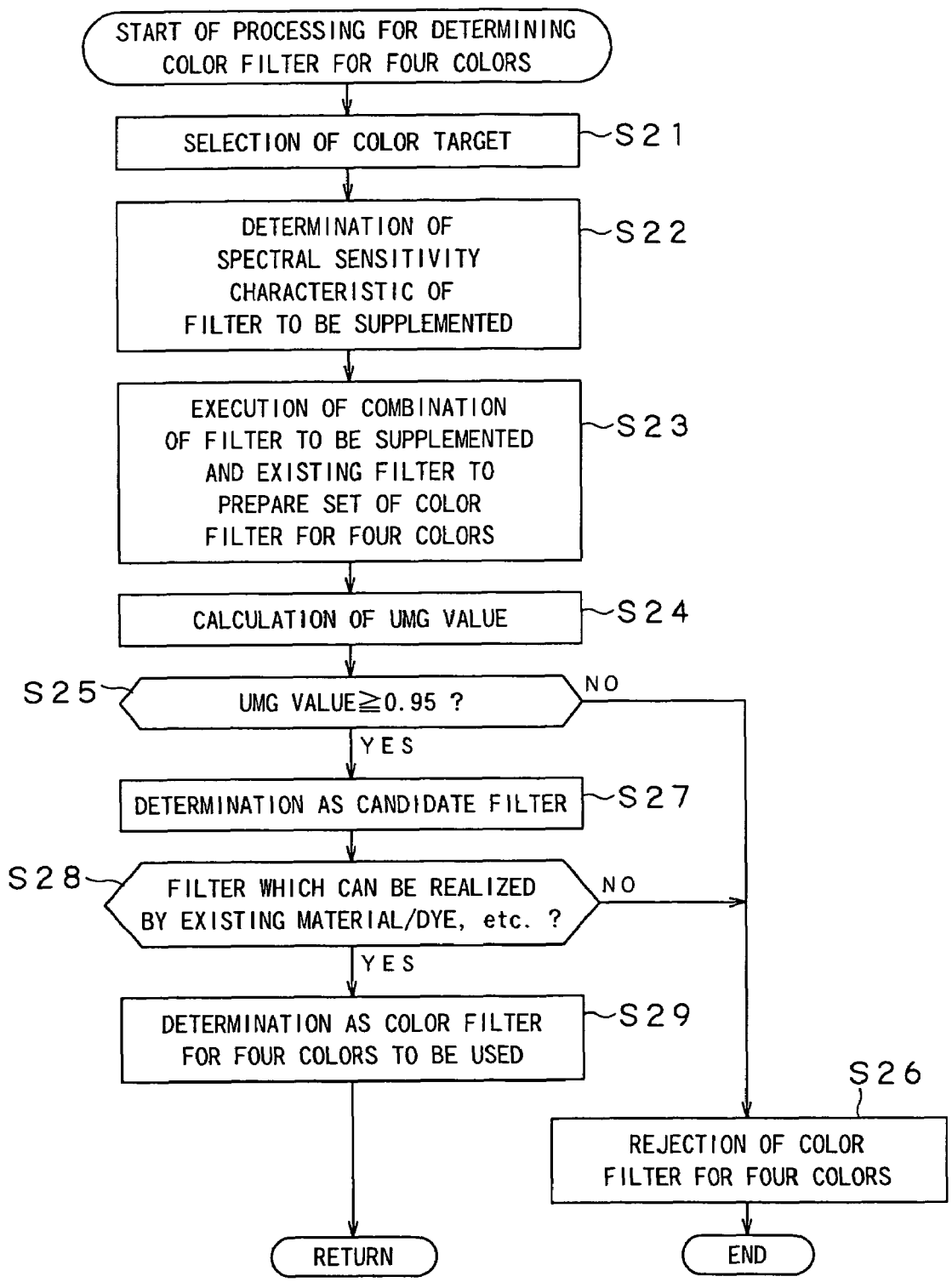
FIG. 12 is a flowchart for explaining the detail of processing for determining color filter for four colors of step S1 of FIG. 11.

In the image pick-up apparatus constituted in this way, since color filter 61 for four colors formed at the front stage unit of the image sensor 45 in accordance with the flowchart shown in FIG. 12, it is possible to improve "discriminating characteristic of color" of "color reproduction characteristic". Moreover, since matrix processing is performed with respect to signals (R, G1, G2, B) in which luminance can be represented by linear transform at signal processing unit 71, color having higher fidelity from a viewpoint of color engineering can be reproduced as compared to the case where matrix processing is performed with respect to signal obtained after undergone gamma processing as in the case of the processing at the signal processing unit 11 shown in FIG. 2. Further, since determination of linear matrix coefficients M is performed in accordance with the image pick-up condition, etc. in the linear matrix processing performed at the linear matrix processing unit 95 of the signal processing unit 71, it is possible to improve color reproduction characteristic and reduction characteristic of noise of picked up images.

It is to be noted that the present invention has been described in accordance with certain preferred embodiments thereof illustrated in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

Since the image pick-up apparatus according to the present invention comprises adjustment unit for adjusting color reproduction value representing high fidelity reproduction of color with respect to way of seeing of the eye of the human being and noise value representing noise feeling that the human being feels, and matrix coefficient determination unit for determining matrix coefficients on the basis of adjustment of the adjustment unit, and matrix transform processing unit for performing matrix transform processing with respect to image which has been picked up at image pick-up device unit provided at the image pick-up apparatus on the basis of the matrix coefficients, linear matrix coefficients M are adaptively determined in accordance with image pick-up environment and image pick-up condition, thus making it possible to perform linear matrix processing by using the linear matrix coefficients M.

In addition, since the image pick-up method according to the present invention includes first step of adjusting color reproduction value representing high fidelity reproduction of color with respect to seeing of the eye of the human being and noise feeling that the human being feels, second step of determining matrix coefficients on the basis of adjustment of the first step, and third step of performing matrix transform processing with respect to image which has been picked up at image pick-up device unit which serves to pick up image of object on the basis of the matrix coefficients, linear matrix coefficients M are adaptively determined in accordance with image pick-up environment and image pick-up condition, thus making it possible to perform linear matrix processing by using the linear matrix coefficients M.

The invention claimed is:

1. An image pick-up apparatus including an image pick-up device unit comprised of color filters having different spectral characteristics, and serving to pick up an image of an object, the image pick-up apparatus comprising:
    adjustment means for adjusting color reproduction value and noise value representing noise;
    matrix coefficient determination means for determining matrix coefficients on the basis of adjustment of the adjustment means; and
    matrix transform processing means for performing matrix transform processing with respect to an image which has been picked up at the image pick-up device unit on the basis of the matrix coefficients,
    wherein the matrix coefficients are determined based on a color reproduction characteristic index and a noise reduction characteristic index.

2. The image pick-up apparatus as set forth in claim 1, wherein the adjustment means serves to adaptively adjust the color reproduction value and the noise value in accordance with image pick-up sensitivity of the image pick-up apparatus.

3. The image pick-up apparatus as set forth in claim 1, wherein the adjustment means serves to adaptively adjust the color reproduction value and the noise value in accordance with the environment where image pick-up operation is performed by the image pick-up apparatus.

4. The image pick-up apparatus as set forth in claim 1, wherein the adjustment means serves to arbitrarily adjust the color reproduction value and the noise value.

5. An image pick-up method of picking up an image of an object by an image pick-up apparatus including an image pick-up unit comprised of color filters having different spectral characteristics, and serving to pick up an image of an object, the image pick-up method including:
    a first step of adjusting color reproduction value and noise value representing noise;
    a second step of determining matrix coefficients on the basis of adjustment of the first step; and
    a third step of performing matrix transform processing with respect to an image which has been picked up at the image pick-up device unit on the basis of the matrix coefficients,
    wherein the matrix coefficients are determined based on a color reproduction characteristic index and a noise reduction characteristic index.

* * * * *